US008689137B2

(12) United States Patent
McCormack et al.

(10) Patent No.: US 8,689,137 B2
(45) Date of Patent: Apr. 1, 2014

(54) COMMAND USER INTERFACE FOR DISPLAYING SELECTABLE FUNCTIONALITY CONTROLS IN A DATABASE APPLICATION

(75) Inventors: Michael J. McCormack, Snohomish, WA (US); Adam Russell Kenney, Seattle, WA (US); Christopher W. Bryant, Seattle, WA (US); Clinton Dee Covington, Kirkland, WA (US); Richard L. Dickinson, Seattle, WA (US); Robert E. Coggins, Bellevue, WA (US); Kelly Michael Krout, Redmond, WA (US); Vitore Selca, Seattle, WA (US); Zachary P. Woodall, Issaquah, WA (US); Dan Jacob Hough, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 862 days.

(21) Appl. No.: 11/401,470

(22) Filed: Apr. 10, 2006

(65) Prior Publication Data

US 2007/0055943 A1    Mar. 8, 2007

Related U.S. Application Data

(60) Provisional application No. 60/714,622, filed on Sep. 7, 2005.

(51) Int. Cl.
*G06F 3/048* (2013.01)
(52) U.S. Cl.
USPC ....................................................... 715/810
(58) Field of Classification Search
USPC ......... 715/810, 821, 708, 777, 841, 843, 845, 715/842
See application file for complete search history.

(56) References Cited

U.S. PATENT DOCUMENTS

| 4,823,283 | A | 4/1989 | Diehm et al. ................. 715/825 |
| 5,155,806 | A | 10/1992 | Hoeber et al. ................ 715/711 |

(Continued)

FOREIGN PATENT DOCUMENTS

| AU | 2005203411 | 3/2006 |
| AU | 2007255043 | 8/2012 |

(Continued)

OTHER PUBLICATIONS

Microsoft Office Word 2003, Part of Microsoft Office Professional Edition 2003, 1983-2003 Microsoft Corporation, screen shot 1, 1 pp.

(Continued)

*Primary Examiner* — Rashawn Tillery
(74) *Attorney, Agent, or Firm* — Micky Minhas

(57) ABSTRACT

An improved user interface is provided for displaying selectable software functionality controls of a database application. When a task-based functionality tab is selected from the user interface, selectable functionality controls provided by the associated database application for performing aspects of a task related to the selected tab are presented in a ribbon-shaped user interface above a workspace in which a user is entering or editing data. Upon selection of a different task-based functionality tab, the presentation of functionality controls associated with the first task is removed, and selectable functionality controls associated with the second selected task-based functionality tab are presented in the user interface. The selectable functionality controls presented in the user interface are grouped into logical groupings for more efficient utilization. An extensibility model is provided for allowing users to develop and use customized user interfaces and to allow utilization of legacy user interfaces.

18 Claims, 25 Drawing Sheets

(56) References Cited

U.S. PATENT DOCUMENTS

| | | | |
|---|---|---|---|
| 5,220,675 A | 6/1993 | Padawer et al. | |
| 5,247,438 A | 9/1993 | Subas et al. | 700/90 |
| 5,305,435 A | 4/1994 | Bronson | |
| 5,323,314 A | 6/1994 | Baber et al. | 705/8 |
| 5,377,354 A | 12/1994 | Scannell et al. | 718/103 |
| 5,412,772 A | 5/1995 | Monson | |
| 5,461,708 A | 10/1995 | Kahn | |
| 5,500,936 A | 3/1996 | Allen et al. | 395/156 |
| 5,519,606 A | 5/1996 | Frid-Nielsen et al. | 705/9 |
| 5,559,875 A | 9/1996 | Bieselin et al. | 379/202.01 |
| 5,559,944 A | 9/1996 | Ono | 715/841 |
| 5,570,109 A | 10/1996 | Jenson | 715/823 |
| 5,581,677 A | 12/1996 | Myers et al. | |
| 5,588,107 A | 12/1996 | Bowden et al. | 715/828 |
| 5,592,602 A | 1/1997 | Edmunds | |
| 5,625,783 A | 4/1997 | Ezekiel et al. | 395/352 |
| 5,634,100 A | 5/1997 | Capps | 705/9 |
| 5,634,128 A | 5/1997 | Messina | 710/200 |
| 5,644,737 A | 7/1997 | Tuniman et al. | 715/810 |
| 5,659,693 A | 8/1997 | Hansen et al. | 715/779 |
| 5,673,403 A | 9/1997 | Brown et al. | 715/744 |
| 5,721,847 A | 2/1998 | Johnson | 395/333 |
| 5,734,915 A | 3/1998 | Roewer | 395/773 |
| 5,760,768 A | 6/1998 | Gram | 345/333 |
| 5,760,773 A | 6/1998 | Berman et al. | 715/808 |
| 5,761,646 A | 6/1998 | Frid-Nielsen et al. | 705/9 |
| 5,764,960 A | 6/1998 | Perks et al. | |
| 5,778,404 A | 7/1998 | Capps et al. | 715/531 |
| 5,787,295 A | 7/1998 | Nakao | 715/210 |
| 5,793,365 A | 8/1998 | Tang et al. | 715/758 |
| 5,796,393 A | 8/1998 | MacNaughton et al. | |
| 5,805,167 A | 9/1998 | Van Cruyningen | 715/808 |
| 5,812,132 A | 9/1998 | Goldstein | 715/797 |
| 5,821,936 A | 10/1998 | Shaffer et al. | 715/810 |
| 5,828,376 A | 10/1998 | Solimene et al. | 715/821 |
| 5,838,321 A | 11/1998 | Wolf | 345/334 |
| 5,842,009 A | 11/1998 | Borovoy et al. | 707/1 |
| 5,844,558 A | 12/1998 | Kumar et al. | 345/339 |
| 5,844,572 A | 12/1998 | Schott | 345/440 |
| 5,855,006 A | 12/1998 | Huemoeller et al. | 705/9 |
| 5,864,848 A | 1/1999 | Horvitz et al. | |
| 5,872,973 A | 2/1999 | Mitchell et al. | |
| 5,873,108 A | 2/1999 | Goyal et al. | 715/203 |
| 5,874,956 A | 2/1999 | LaHood | |
| 5,885,006 A | 3/1999 | Sheedy | 384/192 |
| 5,893,073 A | 4/1999 | Kasso et al. | 705/8 |
| 5,893,125 A | 4/1999 | Shostak | 715/206 |
| 5,898,436 A | 4/1999 | Stewart et al. | 345/354 |
| 5,899,979 A | 5/1999 | Miller et al. | 705/9 |
| 5,905,863 A | 5/1999 | Knowles et al. | 709/206 |
| 5,924,089 A | 7/1999 | Mocek et al. | |
| 5,926,806 A | 7/1999 | Marshall et al. | 707/3 |
| 5,936,625 A | 8/1999 | Kahl et al. | 715/775 |
| 5,937,160 A | 8/1999 | Davis et al. | 709/203 |
| 5,940,078 A | 8/1999 | Nagarajayya et al. | 345/346 |
| 5,943,051 A | 8/1999 | Onda et al. | 715/786 |
| 5,960,406 A | 9/1999 | Rasansky et al. | 705/9 |
| 5,970,466 A | 10/1999 | Detjen et al. | 705/8 |
| 5,999,173 A | 12/1999 | Ubillos | |
| 5,999,938 A | 12/1999 | Bliss et al. | 707/102 |
| 6,008,806 A | 12/1999 | Nakajima et al. | |
| 6,016,478 A | 1/2000 | Zhang et al. | 705/9 |
| 6,018,343 A | 1/2000 | Wang et al. | 345/356 |
| 6,034,683 A | 3/2000 | Mansour et al. | 715/764 |
| 6,038,395 A | 3/2000 | Chow et al. | |
| 6,038,542 A | 3/2000 | Ruckdashel | 705/9 |
| 6,043,816 A | 3/2000 | Williams et al. | |
| 6,067,087 A | 5/2000 | Krauss et al. | 715/762 |
| 6,067,551 A | 5/2000 | Brown et al. | 1/1 |
| 6,072,492 A | 6/2000 | Schagen et al. | 715/733 |
| 6,073,110 A | 6/2000 | Rhodes et al. | |
| 6,073,142 A | 6/2000 | Geiger et al. | |
| 6,101,480 A | 8/2000 | Conmy et al. | 705/9 |
| 6,133,915 A | 10/2000 | Arcuri et al. | 715/779 |
| 6,154,755 A | 11/2000 | Dellert et al. | |
| 6,175,363 B1 | 1/2001 | Williams et al. | |
| 6,188,403 B1 | 2/2001 | Sacerdoti et al. | 715/764 |
| 6,195,094 B1 | 2/2001 | Celebiler | 715/764 |
| 6,199,102 B1 | 3/2001 | Cobb | |
| 6,222,540 B1 | 4/2001 | Sacerdoti | 345/440 |
| 6,236,396 B1 | 5/2001 | Jenson et al. | 715/764 |
| 6,237,135 B1 | 5/2001 | Timbol | |
| 6,239,798 B1 | 5/2001 | Ludolph et al. | |
| 6,256,628 B1 | 7/2001 | Dobson et al. | 707/6 |
| 6,269,341 B1 | 7/2001 | Redcay, Jr. | 705/8 |
| 6,278,450 B1 | 8/2001 | Arcuri et al. | 345/334 |
| 6,289,317 B1 | 9/2001 | Peterson | 705/7 |
| 6,307,544 B1 | 10/2001 | Harding | 715/709 |
| 6,307,574 B1 | 10/2001 | Ashe | |
| 6,313,854 B1 | 11/2001 | Gibson | |
| 6,323,883 B1 | 11/2001 | Minoura et al. | 715/784 |
| 6,326,962 B1 | 12/2001 | Szabo | 715/762 |
| 6,327,046 B1 | 12/2001 | Miyamoto et al. | 358/1.15 |
| 6,341,277 B1 | 1/2002 | Coden et al. | 707/718 |
| 6,359,634 B1 | 3/2002 | Cragun et al. | 715/777 |
| 6,373,507 B1 | 4/2002 | Camara et al. | 345/825 |
| 6,384,849 B1 | 5/2002 | Morcos et al. | 715/810 |
| 6,385,769 B1 | 5/2002 | Lewallen | |
| 6,424,829 B1 | 7/2002 | Kraft | 455/412.1 |
| 6,429,882 B1 | 8/2002 | Abdelnur et al. | 345/763 |
| 6,430,563 B1 | 8/2002 | Fritz et al. | 707/694 |
| 6,433,801 B1 | 8/2002 | Moon et al. | 345/840 |
| 6,433,831 B1 | 8/2002 | Dinwiddie et al. | 348/553 |
| 6,434,598 B1 | 8/2002 | Gish | 709/203 |
| 6,442,527 B1 | 8/2002 | Worthington | 705/8 |
| 6,456,304 B1 | 9/2002 | Angiulo et al. | 345/779 |
| 6,457,062 B1 | 9/2002 | Pivowar et al. | 709/248 |
| 6,459,441 B1 | 10/2002 | Perroux et al. | 345/837 |
| 6,466,236 B1 | 10/2002 | Pivowar et al. | 715/835 |
| 6,469,722 B1 | 10/2002 | Kinoe et al. | 345/837 |
| 6,469,723 B1 | 10/2002 | Gould | |
| 6,480,865 B1 | 11/2002 | Lee et al. | 715/523 |
| 6,484,180 B1 | 11/2002 | Lyons et al. | 1/1 |
| 6,493,006 B1 | 12/2002 | Gourdol et al. | 715/825 |
| 6,507,845 B1 | 1/2003 | Cohen et al. | 707/608 |
| 6,546,417 B1 | 4/2003 | Baker | 709/206 |
| 6,570,596 B2 | 5/2003 | Frederiksen | 715/808 |
| 6,578,192 B1 | 6/2003 | Boehme et al. | 717/115 |
| 6,618,732 B1 | 9/2003 | White et al. | 707/103 |
| 6,621,504 B1 | 9/2003 | Nadas et al. | 715/723 |
| 6,621,508 B1 | 9/2003 | Shiraishi et al. | 715/810 |
| 6,635,089 B1 | 10/2003 | Burkett et al. | 715/513 |
| 6,654,791 B1 | 11/2003 | Bates et al. | |
| 6,664,983 B2 | 12/2003 | Ludolph | 715/775 |
| 6,680,749 B1 | 1/2004 | Anderson et al. | 348/231.99 |
| 6,686,938 B1 | 2/2004 | Jobs et al. | 345/835 |
| 6,691,281 B1 | 2/2004 | Sorge et al. | 715/503 |
| 6,701,513 B1 | 3/2004 | Bailey | |
| 6,707,454 B1 | 3/2004 | Barg | |
| 6,708,205 B2 | 3/2004 | Sheldon et al. | 709/206 |
| 6,721,402 B2 | 4/2004 | Usami | |
| 6,727,919 B1 * | 4/2004 | Reder et al. | 715/810 |
| 6,732,330 B1 | 5/2004 | Claussen et al. | 715/513 |
| 6,734,880 B2 | 5/2004 | Chang et al. | 715/738 |
| 6,750,850 B2 | 6/2004 | O'Leary | |
| 6,750,890 B1 | 6/2004 | Sugimoto | 715/838 |
| 6,785,868 B1 | 8/2004 | Raff | 715/530 |
| 6,789,107 B1 | 9/2004 | Bates et al. | |
| 6,826,729 B1 | 11/2004 | Giesen et al. | 715/837 |
| 6,850,255 B2 | 2/2005 | Muschetto | 715/788 |
| 6,871,195 B2 | 3/2005 | Ryan et al. | 706/46 |
| 6,882,354 B1 | 4/2005 | Nielsen | 715/784 |
| 6,895,426 B1 | 5/2005 | Cortright et al. | |
| 6,904,449 B1 | 6/2005 | Quinones | |
| 6,906,717 B2 | 6/2005 | Couckuyt et al. | 345/440 |
| 6,915,492 B2 | 7/2005 | Kurtenbach et al. | 715/810 |
| 6,924,797 B1 | 8/2005 | MacPhail | 345/326 |
| 6,925,605 B2 | 8/2005 | Bates et al. | 709/206 |
| 6,928,613 B1 | 8/2005 | Ishii | |
| 6,941,304 B2 | 9/2005 | Gainey et al. | |
| 6,956,429 B1 | 10/2005 | Elbanhawy | |
| 6,964,025 B2 | 11/2005 | Angiulo | 715/838 |
| 6,983,889 B2 | 1/2006 | Alles | 236/49.1 |
| 6,988,241 B1 | 1/2006 | Guttman et al. | 715/503 |

(56) References Cited

U.S. PATENT DOCUMENTS

| | | | |
|---|---|---|---|
| 6,990,637 B2 | 1/2006 | Anthony et al. | 715/851 |
| 6,990,652 B1 | 1/2006 | Parthasarathy et al. | |
| 6,990,654 B2 | 1/2006 | Carroll, Jr. | |
| 7,027,463 B2 | 4/2006 | Mathew et al. | |
| 7,032,210 B2 | 4/2006 | Alloing et al. | 717/106 |
| 7,039,596 B1 | 5/2006 | Lu | 705/8 |
| 7,046,848 B1 | 5/2006 | Olcott | 382/176 |
| 7,069,538 B1 | 6/2006 | Renshaw | |
| 7,107,544 B1 | 9/2006 | Luke | 715/752 |
| 7,110,936 B2 | 9/2006 | Hiew et al. | 703/22 |
| 7,111,238 B1 | 9/2006 | Kuppusamy et al. | |
| 7,117,370 B2 | 10/2006 | Khan et al. | 713/186 |
| 7,149,983 B1 | 12/2006 | Robertson et al. | 715/810 |
| 7,152,207 B1 | 12/2006 | Underwood et al. | 715/526 |
| 7,181,697 B2 | 2/2007 | Tai et al. | 715/779 |
| 7,188,073 B1 | 3/2007 | Tam et al. | 705/9 |
| 7,188,317 B1 | 3/2007 | Hazel | 715/804 |
| 7,206,813 B2 | 4/2007 | Dunbar et al. | |
| 7,206,814 B2 | 4/2007 | Kirsch | |
| 7,212,208 B2 | 5/2007 | Khozai | 345/440 |
| 7,216,301 B2 | 5/2007 | Moehrle | 715/811 |
| 7,219,305 B2 | 5/2007 | Jennings | 715/761 |
| 7,240,323 B1 | 7/2007 | Desai et al. | 717/100 |
| 7,249,325 B1 | 7/2007 | Donaldson | 715/777 |
| 7,263,668 B1 | 8/2007 | Lentz | 715/801 |
| 7,290,033 B1 | 10/2007 | Goldman et al. | 709/206 |
| 7,296,241 B2 | 11/2007 | Oshiro et al. | |
| 7,325,204 B2 | 1/2008 | Rogers | 715/792 |
| 7,328,409 B2* | 2/2008 | Awada et al. | 715/765 |
| 7,346,705 B2 | 3/2008 | Hullot et al. | 709/238 |
| 7,356,772 B2 | 4/2008 | Brownholtz et al. | 715/752 |
| 7,386,535 B1 | 6/2008 | Kalucha et al. | |
| 7,386,835 B1 | 6/2008 | Desai et al. | 717/117 |
| 7,392,249 B1 | 6/2008 | Harris et al. | 707/5 |
| 7,395,221 B2 | 7/2008 | Doss et al. | 705/9 |
| 7,395,500 B2 | 7/2008 | Whittle et al. | |
| 7,421,660 B2 | 9/2008 | Charnock et al. | 715/751 |
| 7,421,690 B2 | 9/2008 | Forstall et al. | 709/206 |
| 7,426,713 B2 | 9/2008 | Duggan et al. | |
| 7,469,385 B2 | 12/2008 | Harper et al. | |
| 7,472,117 B2 | 12/2008 | Dettinger et al. | 1/1 |
| 7,499,907 B2 | 3/2009 | Brown et al. | 1/1 |
| 7,555,707 B1 | 6/2009 | Labarge et al. | 715/234 |
| 7,584,253 B2 | 9/2009 | Curbow et al. | |
| 7,627,561 B2 | 12/2009 | Pell et al. | 707/3 |
| 7,664,821 B1 | 2/2010 | Ancin et al. | 709/206 |
| 7,703,036 B2 | 4/2010 | Satterfield et al. | 715/777 |
| 7,707,255 B2 | 4/2010 | Satterfield et al. | 709/206 |
| 7,711,742 B2 | 5/2010 | Bennett et al. | 707/759 |
| 7,716,593 B2 | 5/2010 | Durazo et al. | 715/752 |
| 7,739,259 B2 | 6/2010 | Hartwell et al. | 707/706 |
| 7,747,966 B2 | 6/2010 | Leukart et al. | 715/792 |
| 7,788,598 B2 | 8/2010 | Bansal et al. | 715/810 |
| 7,802,199 B2 | 9/2010 | Shneerson et al. | |
| 7,831,902 B2 | 11/2010 | Sourov et al. | 715/220 |
| 7,853,877 B2 | 12/2010 | Giesen et al. | 715/711 |
| 7,865,868 B2 | 1/2011 | Falzone Schaw et al. | |
| 7,870,465 B2 | 1/2011 | VerSteeg | 714/774 |
| 7,886,290 B2 | 2/2011 | Dhanjal et al. | 717/170 |
| 7,895,531 B2 | 2/2011 | Radtke et al. | 715/810 |
| 8,117,542 B2 | 2/2012 | Radtke et al. | |
| 8,146,016 B2 | 3/2012 | Himberger et al. | |
| 8,150,930 B2 | 4/2012 | Satterfield et al. | |
| 8,201,103 B2 | 6/2012 | Dukhon et al. | |
| 8,239,882 B2 | 8/2012 | Dhanjal et al. | |
| 8,255,828 B2* | 8/2012 | Harris et al. | 715/810 |
| 8,402,096 B2 | 3/2013 | Affronti et al. | |
| 8,484,578 B2 | 7/2013 | Dukhon et al. | |
| 8,605,090 B2 | 12/2013 | Garg et al. | |
| 8,627,562 B2 | 1/2014 | Hartwell et al. | |
| 8,638,333 B2 | 1/2014 | Garg et al. | |
| 2001/0032220 A1 | 10/2001 | Van Hoff | 707/513 |
| 2001/0035882 A1 | 11/2001 | Stoakley et al. | 715/779 |
| 2001/0049677 A1 | 12/2001 | Talib et al. | 707/3 |
| 2002/0007380 A1 | 1/2002 | Bauchot et al. | 707/530 |
| 2002/0029247 A1 | 3/2002 | Kawamoto | 709/206 |
| 2002/0037754 A1 | 3/2002 | Hama et al. | 455/566 |
| 2002/0052880 A1 | 5/2002 | Fruensgaard et al. | 707/104.1 |
| 2002/0054128 A1 | 5/2002 | Lau et al. | |
| 2002/0070977 A1* | 6/2002 | Morcos et al. | 345/810 |
| 2002/0073156 A1 | 6/2002 | Newman | |
| 2002/0075330 A1 | 6/2002 | Rosenzweig et al. | 345/854 |
| 2002/0078143 A1 | 6/2002 | DeBoor et al. | |
| 2002/0083054 A1 | 6/2002 | Peltonen et al. | 707/5 |
| 2002/0091697 A1 | 7/2002 | Huang et al. | 707/10 |
| 2002/0091739 A1 | 7/2002 | Ferlitsch et al. | 707/526 |
| 2002/0099775 A1 | 7/2002 | Gupta et al. | |
| 2002/0122071 A1 | 9/2002 | Camara et al. | |
| 2002/0123984 A1 | 9/2002 | Prakash | |
| 2002/0133557 A1 | 9/2002 | Winarski | 709/207 |
| 2002/0135621 A1 | 9/2002 | Angiulo et al. | 345/838 |
| 2002/0140731 A1 | 10/2002 | Subramaniam et al. | 345/762 |
| 2002/0140740 A1 | 10/2002 | Chen | |
| 2002/0149623 A1 | 10/2002 | West et al. | 345/765 |
| 2002/0149629 A1 | 10/2002 | Craycroft et al. | 345/861 |
| 2002/0154178 A1 | 10/2002 | Barnett et al. | 715/853 |
| 2002/0158876 A1 | 10/2002 | Janssen | 345/504 |
| 2002/0163538 A1 | 11/2002 | Shteyn | 345/752 |
| 2002/0175938 A1 | 11/2002 | Hackworth | 345/751 |
| 2002/0175955 A1 | 11/2002 | Gourdol et al. | 345/821 |
| 2002/0186257 A1 | 12/2002 | Cadiz et al. | 715/764 |
| 2002/0196293 A1 | 12/2002 | Suppan et al. | 345/853 |
| 2003/0005051 A1 | 1/2003 | Gottlieb | |
| 2003/0009455 A1 | 1/2003 | Carlson et al. | 707/6 |
| 2003/0011564 A1 | 1/2003 | Ushino et al. | |
| 2003/0011638 A1 | 1/2003 | Chung | 345/808 |
| 2003/0011639 A1 | 1/2003 | Webb | 345/808 |
| 2003/0014421 A1 | 1/2003 | Jung | 707/102 |
| 2003/0014490 A1 | 1/2003 | Bates et al. | 709/206 |
| 2003/0022700 A1 | 1/2003 | Wang | 455/566 |
| 2003/0025732 A1 | 2/2003 | Prichard | 345/765 |
| 2003/0025737 A1 | 2/2003 | Breinberg | |
| 2003/0035917 A1 | 2/2003 | Hyman | 428/67 |
| 2003/0038832 A1 | 2/2003 | Sobol | |
| 2003/0043200 A1 | 3/2003 | Faieta et al. | 345/804 |
| 2003/0043211 A1 | 3/2003 | Kremer et al. | |
| 2003/0046528 A1 | 3/2003 | Haitani et al. | 713/2 |
| 2003/0050986 A1 | 3/2003 | Matthews et al. | |
| 2003/0066025 A1 | 4/2003 | Garner et al. | 715/500 |
| 2003/0069892 A1 | 4/2003 | Hind et al. | |
| 2003/0069900 A1 | 4/2003 | Hind et al. | |
| 2003/0070143 A1 | 4/2003 | Maslov | 715/513 |
| 2003/0084035 A1 | 5/2003 | Emerick | 707/3 |
| 2003/0093490 A1 | 5/2003 | Yamamoto et al. | 709/213 |
| 2003/0097361 A1 | 5/2003 | Huang et al. | 707/10 |
| 2003/0097640 A1 | 5/2003 | Abrams et al. | 715/530 |
| 2003/0106024 A1 | 6/2003 | Silverbrook et al. | 715/515 |
| 2003/0110191 A1 | 6/2003 | Handsaker et al. | 707/503 |
| 2003/0112278 A1 | 6/2003 | Driskell | 715/788 |
| 2003/0135825 A1 | 7/2003 | Gertner et al. | 715/513 |
| 2003/0156140 A1 | 8/2003 | Watanabe | 345/810 |
| 2003/0160821 A1 | 8/2003 | Yoon | 345/762 |
| 2003/0163537 A1 | 8/2003 | Rohall et al. | 709/206 |
| 2003/0167310 A1 | 9/2003 | Moody et al. | 709/206 |
| 2003/0195937 A1 | 10/2003 | Kircher et al. | 709/207 |
| 2003/0206646 A1 | 11/2003 | Brackett | |
| 2003/0218511 A1 | 11/2003 | Ben-Tovim et al. | 345/440 |
| 2003/0226106 A1 | 12/2003 | McKellar et al. | 715/513 |
| 2003/0233419 A1 | 12/2003 | Beringer | 709/206 |
| 2004/0002941 A1 | 1/2004 | Thorne et al. | |
| 2004/0006570 A1 | 1/2004 | Gelb et al. | 707/102 |
| 2004/0012633 A1 | 1/2004 | Helt | |
| 2004/0021647 A1 | 2/2004 | Iwema et al. | |
| 2004/0024824 A1 | 2/2004 | Ferguson et al. | |
| 2004/0030993 A1 | 2/2004 | Hong Huey et al. | |
| 2004/0056894 A1 | 3/2004 | Zaika et al. | 345/762 |
| 2004/0083432 A1 | 4/2004 | Kawamura et al. | 715/526 |
| 2004/0088359 A1 | 5/2004 | Simpson | |
| 2004/0090315 A1 | 5/2004 | Mackjust et al. | 340/426.13 |
| 2004/0100504 A1 | 5/2004 | Sommer | 345/810 |
| 2004/0100505 A1 | 5/2004 | Cazier | 345/811 |
| 2004/0109025 A1 | 6/2004 | Hullot et al. | 715/764 |
| 2004/0109033 A1 | 6/2004 | Vienneau et al. | 345/863 |
| 2004/0117451 A1 | 6/2004 | Chung | 709/207 |

(56) References Cited

U.S. PATENT DOCUMENTS

| | | | |
|---|---|---|---|
| 2004/0119755 A1 | 6/2004 | Guibourge | |
| 2004/0122789 A1 | 6/2004 | Ostertag et al. | |
| 2004/0125142 A1 | 7/2004 | Mock et al. | 345/765 |
| 2004/0128275 A1 | 7/2004 | Moehrle | 707/1 |
| 2004/0133854 A1 | 7/2004 | Black | 715/517 |
| 2004/0142720 A1 | 7/2004 | Smethers | 455/550.1 |
| 2004/0153968 A1 | 8/2004 | Ching et al. | 715/513 |
| 2004/0164983 A1 | 8/2004 | Khozai | 345/440 |
| 2004/0168153 A1 | 8/2004 | Marvin | 717/120 |
| 2004/0186775 A1 | 9/2004 | Margiloff et al. | 705/14 |
| 2004/0189694 A1 | 9/2004 | Kurtz et al. | |
| 2004/0192440 A1 | 9/2004 | Evans et al. | |
| 2004/0205536 A1 | 10/2004 | Newman et al. | |
| 2004/0212640 A1 | 10/2004 | Mann | |
| 2004/0215612 A1 | 10/2004 | Brody | 707/3 |
| 2004/0230508 A1 | 11/2004 | Minnis et al. | 705/35 |
| 2004/0230906 A1 | 11/2004 | Pik et al. | 715/522 |
| 2004/0236796 A1* | 11/2004 | Bhatt et al. | 707/200 |
| 2004/0260756 A1 | 12/2004 | Forstall et al. | |
| 2004/0261013 A1 | 12/2004 | Wynn et al. | 715/511 |
| 2004/0268231 A1 | 12/2004 | Tunning | 715/513 |
| 2004/0268270 A1 | 12/2004 | Hill et al. | 715/963 |
| 2005/0004989 A1 | 1/2005 | Satterfield et al. | 709/206 |
| 2005/0005235 A1 | 1/2005 | Satterfield et al. | 715/519 |
| 2005/0005249 A1 | 1/2005 | Hill et al. | 715/963 |
| 2005/0010871 A1 | 1/2005 | Ruthfield et al. | 715/712 |
| 2005/0015361 A1 | 1/2005 | Payton et al. | |
| 2005/0021504 A1 | 1/2005 | Atchison | 707/3 |
| 2005/0021521 A1 | 1/2005 | Wycoff | |
| 2005/0022116 A1 | 1/2005 | Bowman et al. | 715/513 |
| 2005/0033614 A1 | 2/2005 | Lettovsky et al. | 705/5 |
| 2005/0039142 A1 | 2/2005 | Jalon et al. | 715/823 |
| 2005/0043015 A1 | 2/2005 | Muramatsu | 455/412.1 |
| 2005/0044500 A1 | 2/2005 | Orimoto et al. | 715/706 |
| 2005/0055449 A1 | 3/2005 | Rappold, III | 709/228 |
| 2005/0057584 A1 | 3/2005 | Gruen et al. | 345/752 |
| 2005/0060337 A1 | 3/2005 | Chou et al. | |
| 2005/0086135 A1 | 4/2005 | Lu | 705/30 |
| 2005/0091576 A1 | 4/2005 | Relyea et al. | |
| 2005/0097465 A1 | 5/2005 | Giesen et al. | 715/700 |
| 2005/0108348 A1 | 5/2005 | Lee | |
| 2005/0114778 A1 | 5/2005 | Branson et al. | 715/711 |
| 2005/0117179 A1 | 6/2005 | Ito et al. | 358/1.15 |
| 2005/0132010 A1 | 6/2005 | Muller | |
| 2005/0132053 A1 | 6/2005 | Roth et al. | 709/227 |
| 2005/0138576 A1 | 6/2005 | Baumert et al. | 715/862 |
| 2005/0144241 A1 | 6/2005 | Stata et al. | |
| 2005/0144284 A1 | 6/2005 | Ludwig et al. | 709/226 |
| 2005/0144568 A1 | 6/2005 | Gruen et al. | 715/822 |
| 2005/0172262 A1 | 8/2005 | Lalwani | 717/109 |
| 2005/0177789 A1 | 8/2005 | Abbar et al. | 705/528 |
| 2005/0183008 A1 | 8/2005 | Crider et al. | 715/517 |
| 2005/0185920 A1 | 8/2005 | Harper et al. | |
| 2005/0203975 A1 | 9/2005 | Jindal et al. | 707/204 |
| 2005/0223066 A1 | 10/2005 | Buchheit et al. | |
| 2005/0223329 A1 | 10/2005 | Schwartz et al. | 715/711 |
| 2005/0234910 A1 | 10/2005 | Buchheit et al. | |
| 2005/0240902 A1 | 10/2005 | Bunker et al. | |
| 2005/0251757 A1 | 11/2005 | Farn | |
| 2005/0278656 A1 | 12/2005 | Goldthwaite et al. | 715/810 |
| 2005/0289109 A1 | 12/2005 | Arrouye et al. | 707/1 |
| 2005/0289158 A1* | 12/2005 | Weiss et al. | 707/100 |
| 2006/0015816 A1 | 1/2006 | Kuehner et al. | 715/744 |
| 2006/0026033 A1 | 2/2006 | Brydon et al. | 705/1 |
| 2006/0026213 A1 | 2/2006 | Yaskin et al. | 707/200 |
| 2006/0026242 A1 | 2/2006 | Kuhlmann et al. | |
| 2006/0036580 A1 | 2/2006 | Stata | 707/3 |
| 2006/0036945 A1* | 2/2006 | Radtke et al. | 715/708 |
| 2006/0036946 A1 | 2/2006 | Radtke et al. | 715/711 |
| 2006/0036950 A1 | 2/2006 | Himberger et al. | 715/732 |
| 2006/0036964 A1 | 2/2006 | Satterfield et al. | 715/777 |
| 2006/0036965 A1* | 2/2006 | Harris et al. | 715/777 |
| 2006/0047644 A1 | 3/2006 | Bocking et al. | |
| 2006/0053383 A1 | 3/2006 | Gauthier et al. | |
| 2006/0064434 A1 | 3/2006 | Gilbert et al. | 707/104.1 |
| 2006/0069604 A1 | 3/2006 | Leukart et al. | 705/9 |
| 2006/0069686 A1 | 3/2006 | Beyda et al. | 707/10 |
| 2006/0080303 A1 | 4/2006 | Sargent et al. | 707/3 |
| 2006/0085502 A1 | 4/2006 | Sundararajan et al. | |
| 2006/0095865 A1* | 5/2006 | Rostom | 715/810 |
| 2006/0101051 A1 | 5/2006 | Carr et al. | 707/102 |
| 2006/0101350 A1 | 5/2006 | Scott | 715/779 |
| 2006/0111931 A1 | 5/2006 | Johnson et al. | 705/1 |
| 2006/0117302 A1 | 6/2006 | Mercer et al. | 717/131 |
| 2006/0129937 A1 | 6/2006 | Shafron | 715/733 |
| 2006/0132812 A1 | 6/2006 | Barnes et al. | 358/1.11 |
| 2006/0155689 A1 | 7/2006 | Blakeley et al. | 707/3 |
| 2006/0161849 A1 | 7/2006 | Miller et al. | 715/744 |
| 2006/0161863 A1 | 7/2006 | Gallo | 715/810 |
| 2006/0168522 A1 | 7/2006 | Bala | |
| 2006/0173961 A1 | 8/2006 | Turski et al. | |
| 2006/0218500 A1 | 9/2006 | Sauve et al. | 715/767 |
| 2006/0242557 A1 | 10/2006 | Nortis, III | 715/234 |
| 2006/0242575 A1 | 10/2006 | Winser | 715/530 |
| 2006/0248012 A1 | 11/2006 | Kircher et al. | 705/50 |
| 2006/0259449 A1 | 11/2006 | Betz et al. | 707/1 |
| 2006/0271869 A1 | 11/2006 | Thanu et al. | 715/764 |
| 2006/0271910 A1 | 11/2006 | Burcham et al. | |
| 2006/0282817 A1 | 12/2006 | Darst et al. | |
| 2006/0294526 A1 | 12/2006 | Hambrick et al. | 719/315 |
| 2007/0006206 A1 | 1/2007 | Dhanjal et al. | 717/168 |
| 2007/0011258 A1 | 1/2007 | Khoo | |
| 2007/0033250 A1 | 2/2007 | Levin et al. | |
| 2007/0050182 A1 | 3/2007 | Sneddon et al. | 704/2 |
| 2007/0055936 A1 | 3/2007 | Dhanjal et al. | |
| 2007/0061306 A1 | 3/2007 | Pell et al. | 707/3 |
| 2007/0061307 A1 | 3/2007 | Hartwell et al. | 707/3 |
| 2007/0061308 A1 | 3/2007 | Hartwell et al. | 707/3 |
| 2007/0061738 A1 | 3/2007 | Taboada et al. | |
| 2007/0094230 A1 | 4/2007 | Subramaniam et al. | |
| 2007/0106951 A1 | 5/2007 | McCormack et al. | 715/764 |
| 2007/0124696 A1 | 5/2007 | Mullender | |
| 2007/0143662 A1 | 6/2007 | Carlson et al. | 715/507 |
| 2007/0180040 A1 | 8/2007 | Etgen et al. | 709/207 |
| 2007/0203991 A1 | 8/2007 | Fisher et al. | |
| 2007/0266017 A1 | 11/2007 | Held et al. | |
| 2007/0282956 A1 | 12/2007 | Staats | 709/206 |
| 2008/0005686 A1 | 1/2008 | Singh | |
| 2008/0040682 A1 | 2/2008 | Sorenson et al. | 715/777 |
| 2008/0052670 A1 | 2/2008 | Espinosa et al. | |
| 2008/0104505 A1 | 5/2008 | Keohane et al. | 715/246 |
| 2008/0109787 A1 | 5/2008 | Wang et al. | |
| 2008/0134138 A1 | 6/2008 | Chamieh et al. | 717/105 |
| 2008/0141242 A1 | 6/2008 | Shapiro | 717/174 |
| 2008/0155555 A1 | 6/2008 | Kwong | 719/315 |
| 2008/0178110 A1 | 7/2008 | Hill et al. | 715/771 |
| 2008/0244440 A1 | 10/2008 | Bailey | |
| 2009/0012984 A1 | 1/2009 | Ravid et al. | 707/101 |
| 2009/0100009 A1 | 4/2009 | Karp | |
| 2009/0106375 A1 | 4/2009 | Carmel et al. | 709/206 |
| 2009/0152349 A1 | 6/2009 | Bonev et al. | |
| 2009/0158173 A1 | 6/2009 | Palahnuk et al. | |
| 2009/0319619 A1 | 12/2009 | Affronti | |
| 2009/0319911 A1 | 12/2009 | McCann | |
| 2010/0011310 A1 | 1/2010 | Rainisto | |
| 2010/0060645 A1 | 3/2010 | Garg et al. | 345/440 |
| 2010/0180226 A1 | 7/2010 | Satterfield et al. | 715/777 |
| 2010/0191818 A1 | 7/2010 | Satterfield et al. | 709/206 |
| 2010/0199261 A1 | 8/2010 | Shenfield et al. | |
| 2010/0211889 A1 | 8/2010 | Durazo et al. | 715/752 |
| 2010/0223575 A1 | 9/2010 | Leukart et al. | 715/779 |
| 2010/0293470 A1 | 11/2010 | Zhao et al. | |
| 2011/0072396 A1 | 3/2011 | Giesen et al. | 715/841 |
| 2011/0138273 A1 | 6/2011 | Radtke et al. | 715/256 |
| 2011/0225249 A1 | 9/2011 | Forstall et al. | |
| 2011/0296322 A1 | 12/2011 | Dhanjal et al. | 715/760 |
| 2012/0179993 A1 | 7/2012 | Himberger et al. | |
| 2012/0215866 A1 | 8/2012 | Satterfield et al. | |
| 2012/0324394 A1 | 12/2012 | Harris et al. | |
| 2013/0014048 A1 | 1/2013 | Satterfield et al. | |
| 2013/0159879 A1 | 6/2013 | Affronti et al. | |
| 2013/0283207 A1 | 10/2013 | Dukhon et al. | |

(56) References Cited

U.S. PATENT DOCUMENTS

FOREIGN PATENT DOCUMENTS

| | | |
|---|---|---|
| CN | 1746914 | 3/2006 |
| CN | 101243439 | 6/2012 |
| CN | 102067166 B | 6/2013 |
| CN | 102317897 | 7/2013 |
| CN | 102077163 | 10/2013 |
| EP | 1 077 405 A2 | 2/2001 |
| EP | 1 104 151 | 5/2001 |
| EP | 1223503 | 7/2002 |
| EP | 1376337 | 2/2004 |
| EP | 1 462 999 A2 | 9/2004 |
| EP | 1 542 133 A2 | 6/2005 |
| EP | 1 564 652 | 8/2005 |
| EP | 1 628 197 | 2/2006 |
| EP | 1 628 198 | 2/2006 |
| EP | 1 628 199 | 2/2006 |
| EP | 1 645 972 | 4/2006 |
| EP | 1 915 001 | 4/2008 |
| GB | 2 329 813 | 3/1999 |
| GB | 2391148 | 1/2004 |
| ID | P 0027717 | 3/2011 |
| ID | P 0027754 | 3/2011 |
| ID | P 0029297 | 10/2011 |
| JP | 03-043824 | 2/1991 |
| JP | 04-186425 | 3/1992 |
| JP | 04-312186 | 11/1992 |
| JP | 05-204579 | 8/1993 |
| JP | 06-052282 | 2/1994 |
| JP | 06-342357 | 12/1994 |
| JP | 09-204289 | 8/1997 |
| JP | 10-074217 | 3/1998 |
| JP | 10-326171 | 12/1998 |
| JP | 11-039292 | 2/1999 |
| JP | 11-175258 | 7/1999 |
| JP | 11-259200 | 9/1999 |
| JP | 2001-034775 | 2/2001 |
| JP | 2001-503893 | 3/2001 |
| JP | 2001-109673 | 4/2001 |
| JP | 2001-222477 | 8/2001 |
| JP | 2001-337944 | 12/2001 |
| JP | 2003-015719 | 1/2003 |
| JP | 2003-101768 | 4/2003 |
| JP | 2003-198630 | 7/2003 |
| JP | 2003-216427 | 7/2003 |
| JP | 2003-256258 | 9/2003 |
| JP | 2003-256302 | 9/2003 |
| JP | 2003-308145 | 10/2003 |
| JP | 2004-078512 | 3/2004 | G06F 17/30 |
| JP | 2004-086896 | 3/2004 |
| JP | 2004-102803 | 4/2004 | G06F 17/30 |
| JP | 2004-512578 | 4/2004 |
| JP | 2004-145569 | 5/2004 | G06F 17/21 |
| JP | 2004-159261 | 6/2004 |
| JP | 2004-185464 | 7/2004 |
| JP | 2004-318842 | 11/2004 |
| JP | 2004-342115 | 12/2004 |
| JP | 2005-025550 | 1/2005 |
| JP | 2005-31995 | 2/2005 |
| JP | 2005-032041 | 2/2005 |
| JP | 2005-182353 | 7/2005 | G06F 17/30 |
| JP | 2005-352849 | 12/2005 |
| JP | 2007-280180 | 10/2007 |
| JP | 2007-531165 | 11/2007 |
| JP | 2008-047067 | 2/2008 |
| JP | 2005-236089 | 9/2011 |
| JP | 4832024 | 9/2011 |
| JP | 5021185 | 6/2012 |
| JP | 5079701 | 9/2012 |
| JP | 5139984 | 11/2012 |
| JP | 5190452 | 2/2013 |
| JP | 5193042 | 2/2013 |
| JP | 5221757 | 3/2013 |
| JP | 5266384 | 5/2013 |
| KR | 10-2003-0070685 | 2/2003 |
| KR | 10-2005-0023805 A | 3/2005 |
| KR | 10-2005-0036702 A | 4/2005 |
| KR | 10-1130421 | 3/2012 |
| KR | 10-1149960 | 5/2012 |
| KR | 10-1149990 | 5/2012 |
| KR | 10-1159334 | 6/2012 |
| KR | 10-1238559 | 2/2013 |
| KR | 10-1298338 | 8/2013 |
| KR | 10-1298461 | 8/2013 |
| KR | 10-1312867 | 9/2013 |
| KR | 10-1323011 | 10/2013 |
| MY | 146456 | 8/2012 |
| MY | 147334 | 7/2013 |
| PH | 1-2005-000404 | 8/2011 |
| RU | 2005-120362 | 1/2007 |
| RU | 2322687 | 4/2008 |
| RU | 2328034 | 6/2008 |
| TW | 460839 | 10/2001 |
| TW | 490652 | 6/2002 |
| TW | 2003-05097 | 10/2003 |
| TW | 1368852 | 7/2012 |
| TW | I389002 | 3/2013 |
| TW | I389043 | 3/2013 |
| TW | I401577 | 7/2013 |
| WO | 92/21091 | 11/1992 |
| WO | 94/20921 | 9/1994 |
| WO | 96/10231 | 4/1996 |
| WO | 96/39654 | 12/1996 |
| WO | 98/20410 | 5/1998 |
| WO | WO 99/04353 | 1/1999 |
| WO | WO 99/27495 | 6/1999 |
| WO | WO 01/55894 | 8/2001 |
| WO | WO 03/003240 A2 | 1/2003 |
| WO | WO 03/098500 | 11/2003 |
| WO | WO 2007/033159 A1 | 3/2007 |
| WO | WO 2007/027737 A1 | 8/2007 |
| WO | 2008/027477 | 3/2008 |
| WO | WO 2008/121718 A1 | 10/2008 |
| WO | 2009-158151 | 12/2009 |
| WO | 2009-158171 | 12/2009 |
| WO | 2009-158172 | 12/2009 |
| ZA | 2010/07809 | 2/2012 |
| ZA | 2010/07810 | 2/2012 |

OTHER PUBLICATIONS

Microsoft Office 2003, Microsoft Office Professional Edition 2003, Microsoft Corporation, 10 pages.
Screendumps—Microsoft Office, Microsoft Office Professional Edition 2003, Microsoft Corporation, 10 pages.
Screendumps—Microsoft Office Outlook, Microsoft Office Outlook Professional Edition 2003, Microsoft Corporation, 2 pages.
Chinese Second Office Action dated Nov. 21, 2008 cited in Appln No. 200510089514.X.
U.S. Official Action dated Jun. 19, 2008 cited in U.S. Appl. No. 10/851,506.
U.S. Official Action dated Jun. 20, 2008 cited in U.S. Appl. No. 10/955,928.
U.S. Official Action dated Jul. 17, 2008 cited in U.S. Appl. No. 10/955,940.
U.S. Official Action dated Dec. 23, 2008 in U.S. Appl. No. 10/955,942.
U.S. Official Action dated Dec. 24, 2008 in U.S. Appl. No. 10/955,967.
U.S. Official Action dated Jan. 6, 2009 in U.S. Appl. No. 10/955,941.
U.S. Office Action dated Jan. 28, 2008 cited in U.S. Appl. No. 10/836,154.
Chilean Office Action dated Nov. 27, 2008 cited in Appln No. 1768-2005.
Chilean Office Action dated Sep. 23, 2008 cited in Appln No. 1770-2005.
Chilean Office Action dated Nov. 27, 2008 cited in Appln No. 1769-2005.
U.S. Appl. No. 12/028,797, filed Feb. 9, 2008 entitled "Side-by-Side Shared Calendars".
U.S. Office Action dated Feb. 20, 2008 cited in U.S. Appl. No. 10/848,774.

(56) References Cited

OTHER PUBLICATIONS

U.S. Office Action dated Feb. 21, 2008 cited in U.S. Appl. No. 10/851,442.
Marshall School of Business, Workshop 1—Introduction to Outlook & E-mail, Apr. 6, 2000, pp. 1-11.
Jane Dorothy Calabria Burke, Ten Minute Guide to Lotus Notes 4.6, Publication date: Dec. 23, 1997, 2 pgs.
Bill Dyszel, Microsoft Outlook 2000 for Windows for Dummies, Copyright 1999, pp. 82-86, 102-103, 141,143.
Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.
Charles Rich, Candace L. Sidner, "Segmented Interaction History in a Collaborative Interface Agent," 1997 ACM, pp. 23-30.
Andrew Dwelly, "Functions and Dynamic User Interfaces," 1989 ACM, pp. 371-381.
Alias I. Wavefront, "The Hotbox: Efficient Access to a Large Number of Menu-items," ACM 1999, pp. 231-237.
Charles Rich, Candace L. Sidner, "Adding a Collaborative Agent to Graphical User Interfaces," 1996 ACM, pp. 21-30.
U.S. Official Action mailed Dec. 23, 2003 in U.S. Appl. No. 09/896,384.
U.S. Official Action mailed Aug. 24, 2004 in U.S. Appl. No. 09/896,384.
U.S. Appl. No. 10/982,073, filed Nov. 5, 2004, entitled "Gallery User Interface Controls".
U.S. Appl. No. 10/836,154, filed Apr. 30, 2004, entitled "Combined Content Selection and Display User Interface".
U.S. Appl. No. 10/848,774, filed May 19, 2004, entitled "Automatic Grouping of Electronic Mail".
Boyce, "Microsoft Outlook Inside Out," 2001, pp. 67, 68, 109, 110, 230, 231, 310, 316-318, 798.
Halvorson and Young, "Microsoft Office XP Inside Out," 2001, pp. 1005-1009, 1015, 1023-1028, 1036-1039, 1093.
Riggsby, McCoy, Haberman and Falciani, "Mastering Lotus Notes and Domino 6," 2003, pp. 135-139.
U.S. Appl. No. 10/851,442, filed May 21, 2004, entitled "Conversation Grouping of Electronic Mail Records".
Riggsby, McCoy, Haberman and Falciani, "Mastering Lotus Notes and Domino 6," 2003, pp. 135-138, 607-612.
U.S. Appl. No. 10/851,506, filed May 21, 2004, entitled "Adaptive Multi-Line View User Interface".
Examination Report, Jul. 25, 2005.
Search Report, Danish Patent and Trademark Office, Sep. 18, 2006.
Written Opinion, Danish Patent and Trademark Office, Sep. 18, 2006.
Search Report, Danish Patent and Trademark Office, Sep. 19, 2006.
U.S. Appl. No. 10/955,940, filed Sep. 30, 2004, entitled "User Interface for Displaying Selectable Software Functionality Controls that are Contextually Relevant to a Selected Object".
U.S. Appl. No. 10/955,967, filed Sep. 30, 2004, entitled "Command User Interface for Displaying Selectable Software Functionality Controls".
U.S. Appl. No. 10/955,942, filed Sep. 30, 2004, entitled "User Interface for Displaying a Gallery of Formatting Options Applicable to a Selected Object".
U.S. Appl. No. 10/955,928, filed Sep. 30, 2004, entitled "User Interface for Providing Task Management and Calendar Information".
U.S. Official Action mailed Apr. 27, 2006 in U.S. Appl. No. 10/800,056.
Amendment to Office Action of Apr. 27, 2006, dated Jul. 27, 2006 in U.S. Appl. No. 10/800,056.
U.S. Official Action mailed Oct. 19, 2006 in U.S. Appl. No. 10/800,056.
Amendment to Office Action of Oct. 19, 2006, dated Jan. 19, 2007 in U.S. Appl. No. 10/800,056.
U.S. Appl. No. 10/800,056, filed Mar. 12, 2004, entitled "Method and System for Data Binding in a Block Structured User Interface Scripting Language".
Khare and Rifkin, "The Origin of (Document) Species," University of California, 1998 (9 pages).
"Separate Structure and Presentation," http://www.webreference.com/html/tutorial5/1.html, Aug. 20, 1998 (4 pages).
"The Style Attribute and CSS Declarations," http://www.webreference.com/html/tutorial5/2, Aug. 20, 1998 (4 pages).
"What's Hot in Internet Services?," http://www.webreference.com/html/tutorial5/3, Aug. 20, 1998 (3 pages).
"The Style Element & CSS Selectors," http://www.webreference.com/html/tutorial5/4.html, Aug. 20, 1998 (e pages).
http://www/webreference.com/html/tutorial5/5.html, Aug. 20, 1998 (3 pages.
"ID & Class Selectors, Pseudoclasses," http://www.webreference.com/html/tutorial5/6.html, Aug. 20, 1998 (3 pages).
http://www.webreference.com/html/tutorial5/7.html, Aug. 20, 1998 (3 pages).
http://www.webreference.com/html/tutorial5/8.html, Aug. 20, 1998 (2 pages).
"External Style Sheets," http://www.webreference.com/html/tutorial5/10.html, Aug. 20, 1998 (3 pages).
Raman, "Cascaded Speech Style Sheets," 1997 (9 pages).
"Primary Windows," http://www-03.ibm.com/servers/eserver/iseries/navigator/guidelines/primary.html, , (23 pages).
"User Interface Standards," http://msdn2.microsoftt.com/en-us/library/aa217660(office.11,d=printer).aspx, Sep. 2001 (5 pages).
"WebSphere Studio Overview," http://researchweb.watson.ibm.com/journal/sj/432/budinsky.html, May 6, 2004 (25 page).
U.S. Official Action mailed Feb. 14, 2007 in U.S. Appl. No. 10/800,056.
U.S. Final Office Action dated Apr. 15, 2008 cited in U.S. Appl. No. 10/955,942.
Screendumps Microsoft Corporation, Microsoft Office Professional Edition 2003, 5 pgs.
U.S. Final Office Action dated Apr. 16, 2008 cited in U.S. Appl. No. 10/955,967.
Screendumps Microsoft Corporation, Microsoft Office Professional Edition 2003, 4 pgs.
U.S. Final Office Action dated May 28, 2008 cited in U.S. Appl. No. 10/982,073.
Chinese Official Action dated Mar. 21, 2008 cited in Chinese Application No. 200510092146.4.
Chinese Official Action dated Mar. 21, 2008 cited in Chinese Application No. 200510092139.4.
Philippine Official Action dated Apr. 21, 2008 cited in Philippine Application No. 1-2005-000405.
Philippine Official Action dated Apr. 21, 2008 cited in Philippine Application No. 1-2005-000406.
U.S. Final Office Action dated Apr. 29, 2008 cited in U.S. Appl. No. 10/955,941.
Habraken, Microsoft Office XP 8 in 1, published Jun. 5, 2001, http://proquest.safaribooksonline.com/0789725096/, 12 pgs.
Word 2002, Chapter 14; Paradigm Publishing Inc., copyright 2002; http://www.emcp.com/tech_tutorials/sig_irc/Signature_Word_Chapter_14.ppt, 21 pgs.
Chilean Office Action dated Mar. 28, 2008 cited in Application No. 1770-05, no English Translation.
Chinese First Office Action dated Apr. 11, 2008 cited in Application No. 200510092141.1.
Chinese Office Action dated Apr. 18, 2008 cited in Application No. 200510092142.6.
U.S. Final Office Action dated Jul. 24, 2008 cited in U.S. Appl. No. 11/151,686.
Microsoft Office Word 2003. Part of Microsoft Office Professional Edition 2003. Copyright 1983-2003 Microsoft Corporation.
Chinese Office Action dated May 23, 2008 cited in Application No. 200510089514.X.
Philippine Official Action dated Jul. 31, 2008 cited in Philippine Application No. 12005000495.
European Communication dated Jun. 23, 2008 cited in European Application No. 04102463.9-2211/1517239.
U.S. Appl. No. 11/154,278, filed Jun. 16, 2005 entitled "Cross Version and Cross Product User Interface Compatibility".

(56) References Cited

OTHER PUBLICATIONS

U.S. Appl. No. 11/151,686, filed Jun. 13, 2005 entitled "Floating Command Object".
U.S. Appl. No. 10/607,020, filed Jun. 26, 2003 entitled "Side-by-Side Shared Calendars".
U.S. Appl. No. 10/741,407, filed Dec. 19, 2003 entitled "Methods, Systems, and Computer-Readable Mediums for Providing Persisting and Continuously Updating Search Folders".
U.S. Appl. No. 11/782,059, filed Jul. 24, 2007 entitled "Methods, Systems, and Computer-Readable Mediums for Providing Persisting and Continuously Updating Search Folders".
U.S. Appl. No. 10/955,941, filed Sep. 30, 2004 entitled "An Improved User Interface for Displaying Selectable Software Functionality Controls that are Relevant to a Selected Object".
Gordon Padwick, Using Microsoft Outlook 2000, Que, Sp. Ed., May 1999.
Becker et al., "Virtual Folders: Database Support for Electronic Messages Classification," Pontificia Universidade Catolica do Rio Grande do Sul, Porto Alegre, Brazil, pp. 163-170.
Goldberg et al., "Using Collaborative Filtering to Weave an Information Tapestry," Communication of the ACM, vol. 35, No. 12, pp. 61-70, Dec. 1992.
Liu et al., "Continual Queries for Internet Scale Event-Driven Information Delivery," IEEE Transactions on Knowledge and Data Engineering, vol. 11, Issue 1, pp. 610-628, 1999.
Chen et al., "NiagaraCQ: A Scalable Continuous Query System for Internet Databases," Int. Conf. On Management of Data, Proc. Of the 2000 ACM SIGMOD Int. Conf. On Management of Data, pp. 379-390, 2000.
Marshall School of Business: "Workshop IV—Calendar," http://www.marshall.usc.edu/computing/PDF_Files/Outlook/Workshop4, PDF, Apr. 10, 2000, pp. 1-4.
M. Williams, "Programming Windows NT4: Unleashed," Sams Publishing, Indianapolis, 1996, pp. index & 167-185.
"Microsoft Outlook 2000: Introduction to Calendar," Version Mar. 25, 2002, http://www.uakron.edu/its/learning/training/docs/Calendar032502.pdf, Mar. 25, 2002, pp. 1-52.
Screen Dumps of Microsoft Outlook (1999, pp. 1-3).
"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.
"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.
Microsoft Windows XP Professional, Version 2002, Service pack 2, 3 pgs.
Camarda, Using Microsoft Word 97, copyright 1997, QUE Corporation, pp. 412, 968.
Australian Search Report dated Jan. 16, 2007 cited in Singapore Application No. 200504474-8.
PCT Search Report dated Feb. 26, 2007 cited in International Application No. PCT/US2006/034993.
European Communicated dated Oct. 20, 2005 cited in EP Application No. 04102463.0-2211 PCT/.
Australian Written Opinion/Search Report cited in Singapore Application No. 200505257-6 mailed Feb. 12, 2007.
U.S. Office Action dated Apr. 12, 2007 cited in U.S. Appl. No. 10/851,506.
U.S. Office Action dated Jun. 4, 2007 cited in U.S. Appl. No. 10/955,940.
U.S. Office Action dated Jul. 26, 2006 cited in U.S. Appl. No. 10/741,407.
U.S. Final Office Action dated Jan. 23, 2007 cited in U.S. Appl. No. 10/741,407.
U.S. Notice of Allowance dated Apr. 10, 2007 cited in U.S. Appl. No. 10/741,407.
U.S. Office Action dated Jan. 4, 2007 cited in U.S. Appl. No. 10/607,020.
U.S. Office Action dated Jun. 14, 2007 cited in U.S. Appl. No. 10/836,154.
U.S. Office Action dated Jun. 21, 2007 cited in U.S. Appl. No. 10/955,928.
U.S. Notice of Allowance dated Jul. 5, 2007 cited in U.S. Appl. No. 10/607,020.
U.S. Office Action dated Jul. 11, 2007 cited in U.S. Appl. No. 10/955,941.
U.S. Office Action dated Jul. 11, 2007 cited in U.S. Appl. No. 10/955,967.
U.S. Office Action dated Jul. 11, 2007 cited in U.S. Appl. No. 10/955,942.
Philippines Examiner's Action dated Sep. 12, 2008 cited in Application No. 1200500406.
Microsoft Office 11 Beta Layperson's Specification, Copyright 2002, Microsoft Corporation, 28 pgs.
FrontPage 11 Beta Layperson's Specification, Copyright 2002, Microsoft Corporation, 12 pgs.
Office 11 Beta Letter, Copyright 2002, Microsoft Corporation, 6 pgs.
Microsoft XDocs Beta Layperson Specification, Copyright 2002, Microsoft Corporation, 3 pgs.
Microsoft Publisher 11 Beta Layperson's Specification, Copyright 2002, Microsoft Corporation, 13 pgs.
U.S. Office Action dated Sep. 26, 2007 cited in U.S. Appl. No. 11/151,686.
U.S. Office Action dated Oct. 9, 2007 cited in U.S. Appl. No. 10/982,073.
Philippines Examiner's Action dated Aug. 19, 2008 cited in Application No. 1-2005-000405.
Chinese Second Office Action dated Oct. 10, 2008 cited in Application No. 200510092141.1.
Chinese Second Office Action dated Oct. 17, 2008 cited in Application No. 200510092139.4.
U.S. Final Office Action dated Oct. 28, 2008 cited in U.S. Appl. No. 11/151,686.
U.S. Office Action dated Jul. 13, 2007 cited in U.S. Appl. No. 10/800,056.
U.S. Final Office Action dated Dec. 4, 2007 cited in U.S. Appl. No. 10/955,940.
U.S. Final Office Action dated Dec. 21, 2007 cited in U.S. Appl. No. 10/851,506.
U.S. Final Office Action dated Dec. 28, 2007 cited in U.S. Appl. No. 10/800,056.
U.S. Final Office Action dated Jan. 8, 2008 cited in U.S. Appl. No. 10/955,928.
U.S. Office Action dated Nov. 25, 2008 cited in U.S. Appl. No. 11/154,278.
U.S. Office Action dated Dec. 11, 2008 cited in U.S. Appl. No. 10/982,073.
Billo, E. Joseph. "Creating Charts: An Introduction," Excel for Chemists: . A Comprehensive Guide, http://www.ahut.edu.cn/yxsz/ahk/Teaching/Excel%for%20Chemists/ChQ2.pdf, 9 pages.
Marsh, Bruce, Integrating Spreadsheet Templates and Data Analysis Into Fluid Power Instruction, Journal of Industrial Technology, vol. 16, No. 4, Aug. 2000-Oct. 2000. http://www.nait.org/jit/Articles/marsh071200.pdf, 7 pages.
Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.
Lisa K. Averett; Joshua R. Knisley; Mark A. Marvin; HAITI: Projecting Tactical Network and Systems Management; 1995 IEEE pp. 906-910.
Mexican Office Action dated Feb. 5, 2009 cited in Appln No. PA/a/2005/008349.
Mexican Office Action dated Mar. 3, 2009 cited in Appln No. PA/a/2005/008351 English language only.
Chinese Third Office Action dated Jun. 19, 2009 cited in Appln No. 200510092139.4.
Russian Office Action dated Jun. 24, 2009 cited in Appln No. 2005120363/28(023023).

(56) References Cited

OTHER PUBLICATIONS

U.S. Official Action dated Feb. 22, 2008 in U.S. Appl. No. 11/445,393.
U.S. Official Action dated Oct. 8, 2008 cited in U.S. Appl. No. 11/445,393.
U.S. Official Action dated Jun. 1, 2009, U.S. Appl. No. 11/445,393.
U.S. Official Action dated Jun. 8, 2009 in U.S. Appl. No. 10/982,073.
U.S. Official Action dated Jun. 10, 2009 in U.S. Appl. No. 11/154,278.
U.S. Official Action dated Jun. 11, 2009 in U.S. Appl. No. 11/151,686.
U.S. Official Action dated Jun. 24, 2009 in U.S. Appl. No. 10/607,020.
Chilean Second Office Action dated Mar. 4, 2009 cited in Appln No. 2512-2005.
U.S. Office Action dated Apr. 28, 2009 in U.S. Appl. No. 12/028,797.
Nielsen, Jacob. "Tabs, Used Right," Alertbox, Sep. 17, 2007, http://www.useit.com/alertbox/tabs.html, 6 pages.
"Managing the Code Editor and View" Microsoft Corporation, http://msdn.microsoft.com/en-us/library/z01zks9a(VS.71).aspx, 2008.
Agarwal, Vikash K., "Creating a Visually Arresting User-Interface: A$_3$D Tab Control Example," Jan. 4, 2008, http://microsoft.apress.com/asptodayarchive/71723/creating-a-visually-arresting-user-interface-a-3d-tab-control-example, 12 pages.
"Omni Web Help," Omni Group, 2004, http://www.omnigroup.com/documentation/omniweb/browser/tabs.html, 2 pages.
Hepfner, Troy, "New SOCET CXP Interface Improves Usability," Sep. 2008, http://www.socetset.com/gxpmosaic/?p=95, 4 pages.
U.S. Appl. No. 12/372,386, filed Feb. 17, 2009 entitled "Command User Interface for Displaying Multiple Sections of Software Functionality Controls".
Chinese Office Action dated Apr. 3, 2009 cited in Appln No. 200510089514.X.
U.S. Office Action dated Apr. 7, 2009 in U.S. Appl. No. 10/955,940.
Berliner E.M. et al., "Microsoft Office 2003", Feb. 24, 2004, p. 39-40, 120-124, 175-177, 233-234 [D1].
Berliner E.M. et al., "Microsoft Office 2003", Feb. 24, 2004, p. 173-178 [D2].
Israeli Office Action dated Sep. 6, 2009 cited in Appln No. 169716.
Israeli Office Action dated Sep. 7, 2009 cited in Appln No. 169718.
Russian Office Action dated Sep. 10, 2009 cited in Appln No. 2005125836/09(029010).
Russian Office Action dated Sep. 10, 2009 cited in Appln No. 2005125839/09(029013).
European Communication dated Sep. 28, 2009 cited in Appln No. 09006972.5-2211.
Chinese Office Action dated Oct. 16, 2009 cited in Appln No. 200510092142.6.
U.S. Official Action dated Nov. 24, 2009 in U.S. Appl. No. 11/445,393.
U.S. Appl. No. 12/574,256, filed Oct. 6, 2009 entitled "Modifying a Chart".
Perronne et al. "Building Java Enterprise Systems with J2EE", Publisher: Sams, Pub Date: Jun. 7, 2000 (pp. 1-8).
Israeli Office Action dated Oct. 12, 2009 cited in Appln No. 170668.
Russian Office Action dated Oct. 26, 2009 cited in Appln No. 2005120363/09(023023).
U.S. Official Action dated Sep. 6, 2007 in U.S. Appl. No. 11/136,800.
U.S. Official Action dated May 30, 2008 cited in U.S. Appl. No. 11/430,562.
U.S. Official Action dated Jun. 27, 2008 cited in U.S. Appl. No. 11/430,416.
U.S. Official Action dated Jul. 9, 2008 cited in U.S. Appl. No. 11/136,800.
U.S. Official Action dated Nov. 13, 2009 in U.S. Appl. No. 11/154,278.
U.S. Official Action dated Dec. 8, 2009 in U.S. Appl. No. 11/151,686.
U.S. Official Action dated Dec. 9, 2009 in U.S. Appl. No. 12/028,797.
U.S. Official Action dated Dec. 10, 2009 in U.S. Appl. No. 10/955,940.
Screendumps—Microsoft Office, Microsoft Corporation, Microsoft Office Professional Edition 2003, 13 pages.
Russian Office Action dated Jul. 21, 2009 cited in Appln No. 2005125837/09(029011).
Russian Office Action dated Jul. 30, 2009 cited in Appln No. 2005125831/09(029005).
European Search Report dated Sep. 7, 2009 cited in EP Application No. 09006972.5-2211.
European Communication dated Sep. 14, 2009 cited in Appln. No. 07795391.7-1225.
U.S. Official Action dated Aug. 4, 2009 in U.S. Appl. No. 10/955,967.
U.S. Official Action dated Aug. 4, 2009 in U.S. Appl. No. 10/955,942.
U.S. Official Action dated Aug. 18, 2009 in U.S. Appl. No. 11/782,059.
PCT Search Report and Written Opinion dated Dec. 29, 2009 cited in International Application No. PCT/US2009/046344.
U.S. Final Office Action dated Jan. 6, 2010 cited in U.S. Appl. No. 10/607,020.
U.S. Official Action dated Jan. 20, 2010 cited in U.S. Appl. No. 10/955,967.
U.S. Office Action dated Jan. 25, 2010 cited in U.S. Appl. No. 10/982,073.
U.S. Appl. No. 12/725,605, filed Mar. 17, 2010 entitled "Improved User Interface for Displaying Selectable Software Functionality Controls that are Relevant to a Selected Object".
U.S. Appl. No. 12/753,923, filed Apr. 5, 2010 entitled "Automatic Grouping of Electronic Mail".
Screendumps—Microsoft Office (Microsoft Corporation, Microsoft Office Professional Edition 2003; 16 pages).
Chinese Office Action dated Jan. 22, 2010 cited in Appln No. 200680032564.7.
Chilean Second Office Action dated Jan. 29, 2010 cited in Appln No. 1769-2005.
Chinese Third Office Action dated Feb. 12, 2010 cited in Appln No. 200510092142.6.
Philippines Examiner's Action dated Mar. 11, 2010 cited in Appln No. 1-2005-000405.
Chinese Office Action dated Mar. 11, 2010 cited in Appln No. 200780020312.7.
Australian Office Action dated Mar. 25, 2010 cited in Appln No. 2005203411.
Australian Office Action dated Mar. 25, 2010 cited in Appln No. 2005203412.
Australian Office Action dated Mar. 26, 2010 cited in Appln No. 2005203409.
Australian Office Action dated Apr. 8, 2010 cited in Appln No. 2005203410.
U.S. Official Action dated Feb. 18, 2010 in U.S. Appl. No. 11/782,059.
U.S. Official Action dated Feb. 19, 2010 in U.S. Appl. No. 10/955,942.
U.S. Official Action dated Apr. 15, 2010 in U.S. Appl. No. 11/823,999.
U.S. Appl. No. 12/769,787, filed Apr. 29, 2010 entitled "Conversation Grouping of Electronic Mail Records".
U.S. Appl. No. 12/777,287, filed May 11, 2010 entitled "User Interface for Providing Task Management and Calendar Information".
U.S. Appl. No. 11/217,071, filed Aug. 30, 2005 entitled "Markup Based Extensibility for User Interfaces".
Clifton, The Application Automation layer—Using XML to Dynamically Generale GUI Elements—forms and controls, The Code Project, Jun. 2003, pp. 1-37.
Australian Office Action dated May 28, 2010 cited in Appln No. 2005202717.
U.S. Official Action dated Mar. 30, 2010 in U.S. Appl. No. 11/217,071.
U.S. Official Action dated May 5, 2010 in U.S. Appl. No. 10/851,506.
U.S. Official Action dated May 25, 2010 in U.S. Appl. No. 10/607,020.
U.S. Official Action dated Jun. 3, 2010 in U.S. Appl. No. 12/028,797.
U.S. Official Acton dated Jun. 22, 2010 in U.S. Appl. No. 11/430,562.
U.S. Official Action dated Jun. 23, 2010 in U.S. Appl. No. 10/955,940.

(56) References Cited

OTHER PUBLICATIONS

U.S. Official Action dated Jul. 1, 2010 in U.S. Appl. No. 11/782,059.
U.S. Official Action dated Jul. 6, 2010 in U.S. Appl. No. 10/955,967.
ScreenShot of MS_Office_2003; (Microsoft Corporation, Microsoft Office Professional Edition 2003; 6 pages).
Halvorson et al., Microsoft Office Professional Official Manual, Aug. 20, 2002, 10 pgs.
Chinese Second Office Action dated Jul. 6, 2010 cited in Appln No. 200680033212.3.
Mexican Office Action dated Aug. 12, 2010 cited in Appln No. 2005/008354.
U.S. Official Action dated Aug. 2, 2010 in U.S. Appl. No. 10/955,942.
U.S. Official Action dated Sep. 21, 2010 in U.S. Appl. No. 11/217,071.
U.S. Official Action dated Sep. 27, 2010 in U.S. Appl. No. 10/836,154.
Padwick, Gordon "Using Microsoft Outlook 2000," 1999 Que Publishing, pp. 530-533.
Slovak, Ken. "Absolute Beginner's Guide to Microsoft Office Outlook 2003." 2003, Que Publishing, pp. 237-241.
Microsoft Press, Microsoft Computer Dictionary, Microsoft Press, Fifth Edition, 2002, pp. 374, 382.
Riggsby, McCoy, Haberman and Falciani, "Mastering Lotus Notes and Domino 6." 2003, pp. 18, 22, 33-35, 47, 122, 123, 215-241, 378.
"About Google Desktop Search", http://www.desktop.google.com/about.html, Oct. 15, 2004, 8 pages.
Find any file or email on your PC as fast as you can type!, http://www.xl.com, 2003, 1 page.
"Lookout", http://www.lookoutsoft.com, Apr. 22, 2005, 20 pages.
"Yahoo to test desktop search", http://news.com.com/yahoo+to+test+desktop+searcach/2100-1032_3-5486381.html, Dec. 9, 2004, 6 pages.
"Microsoft reinvents its own wheel", http://www.theinquirer.net/default.aspx?article=20214, Dec. 14, 2004, 5 pages.
"Microsoft Desktop Search (beta)", http://www.pcmag.com/article2/0.1895.1771841.00.asp, Mar. 2, 2005.
"Windows Desktop Search". Http://kunal.kundale.net/reviews/wds.html, Jul. 10, 2005, 7 pages.
"Microsoft Enters Desktop Search Fray", http://www.internetnews.com/ent-news/article.php/3447331, Dec. 13, 2004, 5 pages.
NZ Application No. 541301, Examination Report dated Jul. 25, 2005.
NZ Application No. 541299, Examination Report dated Jul. 25, 2005.
PCT Written Opinion and Search Report dated Jan. 9, 2007 cited in International Application No. PCT/US2006/033809.
European Search Report dated Nov. 25, 2008 cited in Application EP 06 79 0087.
European Office Action mailed Mar. 9, 2009, cited in Appln No. 06790087.8.
Russian Office Action dated Oct. 30, 2009 cited in Appln No. 2005125837/09(029011).
Chilean Second Office Action dated Nov. 4, 2009 cited in Appln No. 1770-2005.
Chinese Office Action dated Nov. 27, 2009 cited in Appln No. 200680033212.3.
PCT Search Report and Written Opinion dated Nov. 30, 2009 cited in International Application No. PCT/US2009/046341.
Chilean Second Office Action dated Dec. 4, 2009 cited in Appln No. 1768-2005.
Russian Office Action dated Dec. 28, 2009 cited in Appln No. 2005125836/09(029010).
Mexican Office Action dated May 4, 2010 cited in Appln No. 2005/008354.
Israeli Office Action dated Jul. 5, 2010 cited in Appln No. 169718.
Israeli Office Action dated Oct. 28, 2010 cited in Appln No. 169716.
U.S. Official Acton dated Nov. 13, 2008 in U.S. Appl. No. 11/430,562.
U.S. Official Action dated Jan. 9, 2009 in U.S. Appl. No. 11/430,561.
U.S. Official Acton dated Jun. 19, 2009 in U.S. Appl. No. 11/430,562.
U.S. Official Action dated Aug. 17, 2009 in U.S. Appl. No. 11/430,561.
U.S. Official Action dated Sep. 15, 2009 in U.S. Appl. No. 11/217,071.
U.S. Official Acton dated Jan. 7, 2010 in U.S. Appl. No. 11/430,562.
U.S. Official Action dated Dec. 8, 2010 in U.S. Appl. No. 10/851,506.
U.S. Official Action dated Dec. 8, 2010 in U.S. Appl. No. 10/955,967.
U.S. Official Action dated Dec. 16, 2010 in U.S. Appl. No. 11/430,562.
U.S. Official Action dated Dec. 20, 2010 in U.S. Appl. No. 11/445,393.
U.S. Official Action dated Dec. 29, 2010 in U.S. Appl. No. 12/028,787.
U.S. Official Action dated Jan. 5, 2011 in U.S. Appl. No. 11/823,999.
U.S. Appl. No. 12/954,952, filed Sep. 29, 2010 entitled "Gallery User Interface Controls".
Bellavista et al., "A Mobile Infrastructure for Terminal, User, and Resource Mobility", Network Operations and Management Symposium, NOMS 2000, pp. 877-890, IEEE/IFIP.
"Microsoft Office Professional Plus 2007", © 2006, Microsoft Corporation; 66 pgs.
U.S. Official Action dated Nov. 9, 2010 in U.S. Appl. No. 10/607,020.
U.S. Official Action dated Nov. 22, 2010 in U.S. Appl. No. 11/782,059.
U.S. Official Action dated Nov. 26, 2010 in U.S. Appl. No. 12/753,923.
PCT Written Opinion and Search Report dated Sep. 2, 2010 cited in International Application No. PCT/US2010/021888.
Malaysian Substantive Examination Adverse Report dated Sep. 30, 2010 cited in Appln No. PI 20052959.
Australian Office Action dated Oct. 21, 2010 cited in Appln No. 2006284908.
Chinese Second Office Action dated Oct. 29, 2010 cited in Appln No. 200680030421.2.
U.S. Appl. No. 13/027,289, filed Feb. 15, 2011 entitled "Floating Command Object".
Notice on Reexamination dated Jan. 21, 2011 cited in Appln No. 200510089514.X.
Chinese Third Office Action dated Feb. 10, 2011 cited in Appln No. 200680033212.3.
U.S. Official Action dated Dec. 20, 2010 in U.S. Appl. No. 12/574,256.
Egypt Official Decision dated Mar. 14, 2011 cited in Appln No. 2005080371.
Malaysian Substantive Examination Adverse Report dated Mar. 15, 2011 cited in Appln No. PI 20053260.
2nd Notice on Reexamination dated Mar. 25, 2011 cited in Appln No. 200510089514.X.
Philippines Examiner's Action dated Apr. 12, 2011 cited in Appln No. 1-2005-00404.
U.S. Official Action dated Mar. 14, 2011 in U.S. Appl. No. 12/163,784.
U.S. Official Action dated Apr. 21, 2011 in U.S. Appl. No. 11/445,393.
U.S. Official Action dated Apr. 21, 2011 in U.S. Appl. No. 12/574,256.
U.S. Appl. No. 13/102,633, filed May 6, 2011 entitled "Markup Based Extensibility for User Interfaces".
Japanese Notice of Rejection dated May 6, 2011 cited in Appln. No. 2005-236089.
Japanese Notice of Rejection dated May 6, 2011 cited in Appln. No. 2005-236087.
Chinese Second Office Action dated May 19, 2011 cited in Appln No. 200780020312.7.
U.S. Official Action dated May 5, 2011 in U.S. Appl. No. 10/836,154.
U.S. Official Action dated May 12, 2011 in U.S. Appl. No. 12/753,923.
U.S. Official Action dated May 19, 2011 in U.S. Appl. No. 11/430,562.
U.S. Official Action dated May 19, 2011 in U.S. Appl. No. 10/851,506.
Dr. Dobb's Journal; "Windows 95 Common Controls"; May 1, 1995; 12 pgs.
Mexican Office Action Summary, dated Sep. 22, 2011 cited in Appln. No. MX/a/2008/003342.

(56) References Cited

OTHER PUBLICATIONS

Japanese Notice of Rejection dated Nov. 4, 2011 cited in Appln No. 2008-513476.
European Search Report dated Dec. 6, 2011 cited in Appln No. 06803424.8.
Japanese Notice of Rejection dated Dec. 16, 2011 cited in Appln No. 2008-529218.
U.S. Official Action dated Jan. 12, 2012 cited in U.S. Appl. No. 11/782,059.
Microsoft Office 2007 Word Help, 3 pgs.
Alexander, Keeping New Messages Marked 'Unread' (2007), http://certcities.com/editorial/colums/story.asp?EditorialsD=243, 2 pgs.
Wiley, Microsoft® Office Outlook® 2007 for Dummies®, 9 pgs.
Israeli Office Action dated Jun. 3, 2012 cited in Appln No. 189293.
Israeli Office Action dated Aug. 29, 2012 in Appln No. 169717.
Canadian Office Action dated Nov. 29, 2012 cited in Appln No. 2,512,036.
Russian Office Action dated Dec. 12, 2012 cited in Appln No. 2010140069.
Chinese Second Office Action dated Dec. 17, 2012 cited in Appln No. 200980124644.9.
Chinese Third Office Action dated Dec. 31, 2012 in Appln No. 200980124944.7.
Chinese Second Office Action dated Dec. 31, 2012 in Appln No. 200980124945.1.
Chinese Second Office Action dated Jan. 4, 2013 in Appln No. 201080008789.5.
Chinese Office Action dated Jan. 6, 2013 in Appln No. 201080021957.4.
EP Communication dated Jan. 10, 2013 cited in Appln No. PCT/US2010/021888.
Canadian Office Action dated Jan. 18, 2013 in Appln No. 2,512,155.
U.S. Official Action dated Dec. 12, 2012 in U.S. Appl. No. 10/851,506.
U.S. Official Action dated Dec. 12, 2012 in U.S. Appl. No. 12/954,952.
U.S. Official Action dated Dec. 31, 2012 in U.S. Appl. No. 12/142,927.
Korean Notice of Rejection dated Jan. 30, 2012 cited in Appln No. 10-2004-0048176.
Japanese Notice of Rejection dated Feb. 3, 2012 cited in Appln No. 2008-530218.
U.S. Official Action dated Jan. 26, 2012 in U.S. Appl. No. 12/464,584.
U.S. Appl. No. 13/769,598, filed Feb. 18, 2013 entitled "Automatic Conversation Techniques".
Malaysian Substantive Examination Report dated Oct. 31, 2012 cited in Appln No. PI 20053260, 2 pgs.
Malaysia Substantive Examination Adverse Report dated Jan. 15, 2013 in Appln No. PI 20084401, 3 pgs.
EP Search Report dated Jan. 30, 2013 in Appln No. PCT/US2009/044059, 8 pgs.
Mexican Office Action dated Feb. 5, 2013 cited in Appln No. MX/a/2008/014849, 8 pgs.
Chinese Office Action dated Feb. 5, 2013 cited in Appln No. 200910148820.4, 5 pgs.
Mexican Office Action dated Feb. 25, 2013 in Appln No. MX/a/2008/002889, 11 pgs.
U.S. Official Action dated Mar. 1, 2013 in U.S. Appl. No. 11/430,562, 66 pgs.
Aoyagi, Hideo, "Mail Mac Fan Special 33"; Manichi Communications Inc., Mar. 1, 2004, 5 pgs.
Morita, Utako; "Literature Searching System, 'JDream'"; Online Search; vol. 23, No. 4; The Society of Japan Terminal, Dec. 2002; 5 pgs.
Milstein, Sarah; "The Missing Manual: The book that should have been in the box", First Edition; O'Reilly Japan, Inc.; Nov. 25, 2004; 1 pg.
Cole; "New Arrival! Forefront of Downloading"; Mac People; vol. 11, No. 10; ASCII Corporation; Aug. 31, 2005; 1 pg.
Sada, Morihiro; "Clue for Managing Common Data Filed on Server"; Business Personal Computer Age; vol. 15, No. 7; Dempa Publications, Inc.; Jul. 1, 1997; 1 pg.
Japanese Notice of Rejection dated Nov. 25, 2011 cited in Appln. No. 2008-531249.
Malaysian Substantive Examination Adverse Report dated Jan. 31, 2012 cited in Appln No. PI 20053259.
European Search Report dated Feb. 23, 2012 cited in Appln No. 05107153.8.
Chinese Office Action dated Feb. 29, 2012 cited in Appln No. 200980124664.9.
Chinese Decision on Rejection dated Mar. 7, 2012 cited in Appln No. 200780020312.7.
Chinese Second Office Action dated Mar. 9, 2012 cited in Appln No. 200980124383.0.
Japanese Notice of Final Rejection dated Mar. 9, 2012 cited in Appln No. 2008-513476.
U.S. Official Action dated Feb. 27, 2012 in U.S. Appl. No. 12/372,386.
U.S. Official Action dated Mar. 14, 2012 in U.S. Appl. No. 12/142,927.
U.S. Appl. No. 13/437,031, filed Apr. 2, 2012 entitled "Automatic Grouping of Electronic Mail".
U.S. Appl. No. 13/427,939, filed Mar. 23, 2012 entitled "An Improved User Interface for Displaying a Gallery of Formatting Options Applicable to a Selected Object".
Douglas et al., "Dynamic Popup Menu Titles"; IP.Com Journal, IP.Com Inc., West Henrietta, NY, Aug. 1, 1992, 2 pgs.
Haden et al.; "Scrollable Popup Menu with Selection Tracking Display of Graphical Objects"; IP.Com Journal, IP.Com Inc., West Henrietta, NY, Aug. 1, 1994, 6 pgs.
"Index Card Metaphor for Multiple Property Sheets Associated with a Given Object"; IBM Technical Disclosure Bulletin, International Business Machines Corp., vol. 33, No. 3A, Aug. 1, 1990, 2 pgs.
"Menu Selection Method for Related Attributes"; IBM Technical Disclosure Bulletin, International Business Machines Corp., vol. 33, No. 6B, Nov., 1990, 3 pgs.
Ribbons; Microsoft; © 2012 Microsoft; http://msdn.microsoft.com/en-us/library/windows/desktop/cc872782.aspx; 45 pgs.
AutoCAD 2011—Customization Guide; Feb. 2010; Autodesk, Inc.; http://images.autodesk.com/adsk/files/acad_acg.pdf; 554 pgs.
Malaysian Substantive Examination Adverse Report dated Jan. 31, 2012 cited in Appln No. PI 20053258.
Chinese Decision on Reexamination dated Feb. 1, 2012 cited in Appln No. 200510089514.X.
European Search Report dated Feb. 15, 2012 cited in Appln No. 05107157.9.
European Search Report dated Feb. 28, 2012 cited in Appln No. 05107184.3.
European Search Report dated Mar. 16, 2012 cited in Appln No. 05107186.6.
Taiwan Notice of Allowance dated Mar. 29, 2012 cited in Appln No. 10120306600.
Chilean Office Action dated Mar. 29, 2012 cited in Appln No. 1560-2010.
Chilean Office Action dated Mar. 29, 2012 cited in Appln No. 1559-2010.
India First Examination Report dated Mar. 30, 2012 cited in Appln No. 1817/DEL/2005.
Japanese Notice of Allowance dated Apr. 11, 2012 cited in Appln No. 2008-530229.
U.S. Official Action dated Apr. 5, 2012 in U.S. Appl. No. 12/163,758.
U.S. Official Action dated Apr. 19, 2012 in U.S. Appl. No. 13/102,633.
Miser, "Special Edition Using Mac OS X v10.7"; Pub. Date Jan. 3, 2003; QUE; Spe. Ed.; pp. 272-275.
Mori et al., "Design and Development of Multidevice User Interfaces through Multiple Logical Descriptions"; Aug. 2004; vol. 30; 14 pgs.
Canadian Office Action dated Nov. 29, 2012 cited in Appln No. 2,511,101 3 pgs.
Korean Notice of Rejection dated Feb. 22, 2013 in Appln No. 10-2008-7005078 13 pgs.

(56) References Cited

OTHER PUBLICATIONS

Korean Notice of Rejection dated Feb. 25, 2013 in Appln No. 10-2008-7005366, 5 pgs.
Japanese Notice of Preliminary Rejection dated Mar. 12, 2013 in Appln No. 2011-516371, 4 pgs.
Korean Notice of Preliminary Rejection dated Mar. 19, 2013 in Appln No. 10-2008-7005659, 4 pgs.
Japanese Notice of Preliminary Rejection dated Mar. 19, 2013 in Appln No. 2011-514652, 6 pgs.
Chinese Fourth Office Action dated Apr. 23, 2013 cited in Appln No. 200980124944.7, 7 pgs.
U.S. Official Action dated Mar. 14, 2013 in U.S. Appl. No. 12/574,256, 73 pgs.
U.S. Official Action dated Apr. 1, 2013 in U.S. Appl. No. 12/163,784, 39 pgs.
U.S. Official Action dated Apr. 4, 2013 in U.S. Appl. No. 11/782,059, 39 pgs.
U.S. Official Action dated Apr. 18, 2013 in U.S. Appl. No. 10/851,506, 34 pgs.
U.S. Appl. No. 13/464,572, filed May 4, 2012 entitled "Accessing an Out-Space User Interface for a Document Editor Program".
Changing a Graph Type: Ultimate Illustration of Excel 2002 for Windows XP, General Book, X-media Corp., Aug. 31, 2002, p. 224.
Mexican Office Action dated Feb. 3, 2012 cited in Appln No. MX/a/2008/002889 with summary.
Taiwan Office Action dated Feb. 8, 2012 cited in Appln No. 94123640, with Eng Lang Summary.
Israeli Office Action dated Feb. 23, 2012 cited in Appln No. 170668.
Taiwan Search Report dated Mar. 14, 2012 cited in Appln No. 094123420.
Chinese Fourth Office Action dated Apr. 27, 2012 cited in Appln No. 200680018095.3.
Japanese Notice of Rejection dated May 11, 2012 cited in Appln No. 2009-513223.
U.S. Official Action dated Apr. 26, 2012 in U.S. Appl. No. 11/782,059.
U.S. Official Action dated May 8, 2012 in U.S. Appl. No. 12/144,642.
Seo et al, "Hangul Office 2000 Tutoring Book", Sep. 15, 2000, 16 pgs.
Office 2007, Microsoft, Released on Nov. 6, 2006, 23 pgs.
Mexican Office Action dated Mar. 31, 2011 cited in Appln No. PA/a/2005/008351.
Mexican Office Action dated Mar. 31, 2011 cited in Appln No. PA/a/2005/008349.
Mexican Office Action dated Mar. 31, 2011 cited in Appln No. PA/a/2005/008350.
Korean Notice of Rejection dated May 17, 2011 cited in Appln No. 10-2004-48176.
Russian Office Action dated Jun. 14, 2011 cited in Appln No. 2008147090.
U.S. Official Action dated Jun. 9, 2011 in U.S. Appl. No. 12/464,584.
Russel et al., (hereinafter "Russel"); "Special Edition Using Microsoft ® Office Outlook ® 2003"; Que publishing on Sep. 25, 2003, 71 pgs.
Israeli Office Action dated May 3, 2012 cited in Appln No. 169718.
Taiwan Office Action dated May 14, 2012 cited in Appln No. 94122180, with Eng Lang Summary.
Mexican Office Action dated Jun. 6, 2012 cited in Appln No. MX/a/2008/014849.
Chinese Second Office Action dated Jun. 18, 2012 in Appln No. 200910148820.4.
U.S. Official Action dated Jun. 6, 2012 in U.S. Appl. No. 12/777,287.
U.S. Official Action dated Jun. 19, 2012 in U.S. Appl. No. 12/769,787.
Redmond, Tony; Excerpt from Book; Microsoft Exchange Server 2003; Published 2003; 14 pgs.
Chinese Office Action dated Jul. 2, 2012 in Appln No. 200980124944.7.
Chinese Office Action dated Jul. 12, 2012 in Appln No. 201080008789.5.
Chinese Decision on Rejection dated Jul. 31, 2012 cited in Appln No. 200680018095.3.
Chinese Office Action dated Aug. 2, 2012 in Appln No. 200980124945.1.
Homeworking Forum; archived Dec. 6, 2004; 11 pgs.
Japanese Office Action dated Jun. 10, 2011 cited in JP Application No. 2008-530229, w/translation.
Chinese Third Office Action dated Jun. 21, 2011 cited in Appln No. 200680030421.2.
Chinese Second Office Action dated Jul. 14, 2011 cited in Appln No. 20680018095.3.
Chinese Decision on Rejection dated Jul. 21, 2011 cited in Appln No. 20068032789.2.
U.S. Official Action dated Jun. 7, 2011 in U.S. Appl. No. 11/332,822.
U.S. Official Action dated Jul. 8, 2011 in U.S. Appl. No. 12/163,784.
U.S. Official Action dated Aug. 3, 2011 in U.S. Appl. No. 12/142,927.
U.S. Appl. No. 13/595,084, filed Aug. 27, 2012 entitled "Command User Interface for Displaying Selectable Software Functionality Controls".
Mexican Office Action Summary dated Jun. 25, 2012 in Appln No. PA/a/2005/008354.
Korean Notice of Preliminary Rejection dated Jul. 2, 2012 cited in Appln No. 10-2012-0024393.
Korean Notice of Preliminary Rejection dated Jul. 19, 2012 cited in Appln No. 10-2007-7024571.
Chinese Third Office Action dated Aug. 14, 2012 in Appln No. 200980124383.0.
U.S. Official Action dated Aug. 7, 2012 in U.S. Appl. No. 10/836,154.
Ohmori, Yasuo et al., "Eigyo Mind—A Sales Support Tool," PFu Tech. Rev., vol. 10, No. 1, pp. 32-38, PFU Limited, May 1, 1999.
Korean Notice of Preliminary Rejection dated Jul. 22, 2011 cited in Appln No. 10-2005-0058160.
Japanese Notice of Rejection dated Aug. 12, 2011 cited in Appln. No. 2005-184990.
Korean Preliminary Rejection dated Aug. 23, 2011 cited in Appln. No. 10-2005-0067236.
Korean Preliminary Rejection dated Aug. 23, 2011 cited in Appln. No. 10-2005-0067411.
Korean Preliminary Rejection dated Aug. 29, 2011 cited in Appln. No. 10-2005-0066460.
Australian Office Action dated Aug. 31, 2011 cited in Appln. No. 2007255043.
3rd Official Notice, Mailing No. 134028, dated Sep. 16, 2001 cited in Appln. No. PH1707009.
4th Official Notice, Mailing No. 134052, dated Sep. 16, 2001 cited in Appln. No. PH1707009.
Mexican Office Action dated Oct. 3, 2011 cited in Appln. No. MX/a/2008/014849.
U.S. Official Action dated Sep. 13, 2011 in U.S. Appl. No. 12/372,386.
U.S. Official Action dated Sep. 14, 2011 in U.S. Appl. No. 12/163,758.
U.S. Appl. No. 13/615,668, filed Sep. 14, 2012 entitled "User Interface for Displaying Selectable Software Functionality Controls that are Relevant to a Selected Object".
Malaysian Examination Report dated Aug. 30, 2012 in Appln No. PI 20080400.
Chinese Second Office Action dated Sep. 12, 2012 in Appln No. 200980124944.7.
Mexican Office Action Summary dated Sep. 18, 2012 in Appln No. MX/a/2008/003342.
Chilean Office Action dated Sep. 21, 2012 cited in Appln No. 1560-2010, w/English Language Summary.
EP Communication dated Sep. 26, 2012 cited in Appln No. PCT/US2006/034993.
U.S. Official Action dated Sep. 11, 2012 in U.S. Appl. No. 12/163,784.
U.S. Official Action dated Sep. 13, 2012 in U.S. Appl. No. 13/437,031.
U.S. Official Action dated Oct. 25, 2011 in U.S. Appl. No. 12/144,642.
U.S. Official Action dated Nov. 2, 2011 cited in U.S. Appl. No. 10/836,154.

(56) References Cited

OTHER PUBLICATIONS

Korean Notice of Preliminary Rejection dated Nov. 12, 2012 cited in KR-10-2008-7005939.
Chilean Second Office Action dated Nov. 21, 2012 cited in Appln No. 1559-2010.
Canadian Office Action dated Nov. 23, 2012 cited in Appln No. 2,512,102.
Canadian Office Action dated Nov. 29, 2012 cited in Appln No. 2,512,047.
U.S. Official Action dated Oct. 24, 2012 in U.S. Appl. No. 13/102,633.
U.S. Official Action dated Nov. 23, 2012 in U.S. Appl. No. 11/782,059.
U.S. Official Action dated Dec. 5, 2012 in U.S. Appl. No. 12/777,287.
Adler, "Emerging Standards for Component Software," Cybersquare, 1995 IEEE, 10 pgs.
Chamberland, et al., "IBM VisualAge for Java," vol. 37, No. 3, 1998, 26 pgs., http://researchweb.watson.ibm.com/journal/sj/373/chamberland.html [Accessed Feb. 6, 2007].
Zykov, "ConceptModeller: A Problem-Oriented Visual SDK for Globally Distributed Enterprise Systems." Proceedings of the 7th International Workshop on Computer Science and Information Technologies, CSIT 2005, 4 pgs.
"Create Office add-ins: ribbons, toolbars, taskpanes, menus etc.", http://www.add-in-express.com/creating-addins-blog/feed/, Jul. 4, 2007.
"RibbonX API: Extend the 2007 Office System with Your Own Ribbon Tabs and Controls", 2007, Microsoft Corporation, http://msdn.microsoft.com/msdnmag/issues/07/02RibbonX/de-fault.aspx.
"What's New in Excel 2007", Feb. 26, 2007.
Whitechapel et al., "Microsot Visual Studio 2005 Tools for the 2007 Microsoft Office", Sep. 2006, http://72.14.235.104/search?q=cache:kXdufDB6o-wJ;download.microsoft.com/download/3/2/d/32db7049-bc04-4c79-a91b-7f62eaae754a/VSTO2005SE_Tutorial.
doc+This+tutorial+focuses+on+the+new+features+features+introduced+in+VSTO+2005_SE&hl=en&ct=clnk&cd=3&gl=in.
"The New "Office 2007" User Interface", Microsoft Corporation © 2005, 32 pgs.
"The New Look in Office 12 / Office 2007", OFFICE Watch, posted Sep. 20, 2005, 9 pgs.
Atwood, "Sometime a Word is Worth a Thousand Icons", Coding Horror, Feb. 22, 2006, 9 pgs.
The Discussion Board Component of Blackboard: An Instructor's Guide; Aug. 2004; 23 pgs.
Hock, "Yahoo! To the Max"; May 10, 2005; 5 excerpted pgs.
Gina Danielle Venolia et al., Supporting Email Workflow, revised Dec. 2001; 11 pgs.
Mock et al., "An Experimental Framework for Email Categorization and Management", Sep. 9-12, 2001, 3 pgs.
Yang, "Email Categorization Using Fast Machine Learning Algorithms", 2002, 8 pgs.
Islam et al., "Email Categorization Using Multi Stage Classification Technique", 2007, 3 pgs.
"Look and Layout", retrieved at <<http://liv.ac.uk/csd/email/outlook/layout.htm>>, University of Liverpool, 9 pgs.
"Preview Pane in Conversation: 4 pane view", 2005, Zinbra Inc., 3 pgs.
"Reading Pane in Conversation View", retrieved at <<http://www.zimbra.com/forums/users/5918-reading-pane-conversation-view.html>>, 5 pgs.
New Zealand Office Action dated Oct. 14, 2009 cited in NZ Application No. 566363.
European Office Action dated Jun. 15, 2010 cited in EP Application No. 06814358.5.
Russian Office Action dated Jul. 26, 2010 cited in RU Application No. 2008109034, w/translation.
Chinese Office Action dated Nov. 11, 2010 cited in CN Application No. 200680032789.2, w/translation.
Russian Office Action dated Nov. 12, 2010 cited in Application No. 2008109034, w/translation.

PCT Written Opinion and Search Report dated Nov. 29, 2010 cited in International Application No. PCT/US2010/034277.
Mexican Office Action dated Jan. 6, 2011 cited in Appln No. PA/a/2005/008354.
Australian OA dated Jan. 17, 2011 cited in Application No. 2006287408.
Chinese Second Office Action dated Apr. 7, 2011 cited in Application No. 200680032789.2, w/translation.
Mexican Office Action dated May 26, 2011 cited in Appln. No. MX/a/2009/004151.
Korean Notice of Rejection dated Nov. 3, 2011 cited in Appln No. 10-2005-0067257.
Japanese Notice of Rejection dated Nov. 11, 2011 cited in Appln. No. 2008-530229.
Chinese Office Action dated Nov. 18, 2011 cited in Appln. No. 200910148820.4.
Chinese Office Action dated Nov. 29, 2011 cited in Appln. No. 200980124383.0.
Chinese Third Office Action dated Dec. 5, 2011 cited in Appln. No. 200680018095.3.
U.S. Official Action dated Oct. 5, 2009 in U.S. Appl. No. 11/332,822.
U.S. Official Action dated Apr. 23, 2010 in U.S. Appl. No. 12/144,642.
U.S. Official Action dated Jun. 25, 2010 in U.S. Appl. No. 11/332,822.
U.S. Official Action dated Sep. 16, 2010 in U.S. Appl. No. 12/144,642.
U.S. Official Action dated Jan. 6, 2011 in U.S. Appl. No. 12/142,927.
U.S. Official Action dated Feb. 1, 2011 in U.S. Appl. No. 11/332,822.
U.S. Official Action dated Feb. 1, 2011 in U.S. Appl. No. 12/144,642.
Israeli Office Action dated Jun. 18, 2013 cited in Appln No. 170668.
EP Communication dated Jul. 17, 2013 in Appln No. EP 07 795 391.7.
Chinese Second Office Action dated Aug. 5, 2013 in Appln No. 201080021957.4.
Russian Decision on Grant dated Aug. 12, 2013 in Appln No. 2010151922/08.
U.S. Official Action dated Aug. 2, 2013 in U.S. Appl. No. 121777,287, 47 pgs.
U.S. Official Action dated Aug. 14, 2013 in U.S. Appl. No. 11/332,822, 102 pgs.
U.S. Official Action dated Aug. 19, 2013 in U.S. Appl. No. 10/851,506, 24 pgs.
U.S. Official Action dated Aug. 30, 2013 in U.S. Appl. No. 12/574,256, 31 pgs.
U.S. Official Action dated Sep. 6, 2013 in U.S. Appl. No. 12/028,797, 113 pgs.
U.S. Appl. No. 14/032,094, filed Sep. 19, 2013 entitled "User Interface for Displaying Selectable Software Functionality Controls that are Relevant to a Selected Object", Satterfield et al.
Canadian Office Action dated Sep. 18, 2013 in Appln No. 2,512,036.
Japanese Notice of Rejection dated Sep. 19, 2013 in Appln No. 2012-153634.
Canadian OA dated Oct. 7, 2013 in Appln No. 2,650,016.
Chilean Third Office Action dated Oct. 9, 2013 in Appln No. 2512-2005.
Mexican Office Action dated Oct. 28, 2013 cited in Appln. No. MX/a/2010/013566.
Mexican Office Action dated Sep. 27, 2013 in Appln No. MX/a/2008/014849.
EP Communications to Attend Oral Proceedings dated Oct. 10, 2013 in Appln No. 09 006 972.5.
EP Search Report dated May 10, 2013 cited in Appln No. PCT/US2009/044292.
Russian Office Action dated May 13, 2013 cited in Appln No. 2010-151922.
Korean Final Notice of Preliminary Rejection dated May 20, 2013 cited in Appln No. 10-2008-7005939.
Chinese Notice on Third Office Action dated Jun. 5, 2013 cited in Appln No. 200980124644.9.
Mexican Office Action dated Jun. 11, 2013 in Appln No. PA/a/2005/008351.

(56) References Cited

OTHER PUBLICATIONS

Mexican Office Action dated Jun. 20, 2013 in Appln No. MX/a/2010-014056.
U.S. Official Action dated Jun. 3, 2013 in U.S. Appl. No. 13/102,622, 29 pgs.
U.S. Official Action dated Jul. 18, 2013 in U.S. Appl. No. 10/607,020, 109 pgs.
U.S. Official Action dated Jul. 23, 2013 in U.S. Appl. No. 11/782,059, 35 pgs.
U.S. Official Action dated Jul. 24, 2013 in U.S. Appl. No. 12/142,927, 42 pgs.
EP Search Report dated Apr. 18, 2013 in Appln No. PCT/US2006/012724, 12 pgs.
Philippines Substantive Examination Report dated Apr. 25, 2013 cited in Appln No. 1-2005-000495.
Mexican Office Action dated May 23, 2013 in Appln No. MX/a/2008/003342.
U.S. Official Action dated Apr. 29, 2013 in U.S. Appl. No. 12/954,952, 18 pgs.
U.S. Official Action dated May 21, 2013 in U.S. Appl. No. 13/437,031, 13 pgs.
U.S. Appl. No. 13/925,523 filed Jun. 24, 2013 entitled "Communication Between a Document Editor-in-Space User Interface and a Document Editor Out-Space User Interface", Dukhon et al.
Israeli Office Action dated Oct. 17, 2013 cited in Appln No. 1611334.
India First Examination Report dated Oct. 21, 2013 cited in Appln No. 1017/DEL/2004.
Canadian Office Action dated Oct. 30, 2013 in Appln No. 2,512,047.
Korean Notice of Preliminary Rejection dated Nov. 7, 2013 cited in KR-10-2008-7029272.
Canadian Office Action dated Nov. 15, 2013 in Appln No. 2,512,102.
U.S. Official Action dated Nov. 8, 2013 in U.S. Appl. No. 13/615,668, 114 pgs.
U.S. Official Action dated Nov. 15, 2013 in U.S. Appl. No. 11/782,059, 33 pgs.
U.S. Official Action dated Nov. 29, 2013 in U.S. Appl. No. 12/144,642, 73 pgs.
U.S. Appl. No. 14/142,132, filed Dec. 27, 2013 entitled "Expanded Search and Find User Interface".
U.S. Appl. No. 14/150,531, filed Jan. 8, 2014 entitled "Modifying and Formatting a Chart Using Pictorially Provided Chart Elements".
Chinese Third Office Action dated Dec. 4, 2013 in Appln No. 200680032789.2.
Canadian Office Action dated Dec. 5, 2013 in Appln No. 2,618,169.
Chinese Decision on Rejection dated Jan. 13, 2014 in Appln No. 200980124644.9.
U.S. Official Action dated Dec. 6, 2013 in U.S. Appl. No. 10/851,506, 25 pgs.
U.S. Official Action dated Jan. 16, 2014 in U.S. Appl. No. 13/102,633, 45 pgs.
U.S. Official Action dated Jan. 29, 2014 in U.S. Appl. No. 12/777,287, 44 pgs.

* cited by examiner

COMMAND USER INTERFACE FOR DISPLAYING SELECTABLE FUNCTIONALITY CONTROLS IN A DATABASE APPLICATION

CROSS-REFERENCE TO RELATED APPLICATIONS

This patent application claims priority to U.S. Patent Application Ser. No. 60/714,622, filed Sep. 7, 2005, entitled "Database Application Ribbon Command Organization Background."

BACKGROUND

With the advent of the computer age, computer and software users have grown accustomed to user-friendly software applications that help them write, calculate, organize, prepare presentations, send and receive electronic mail, store and manipulate data, make music, and the like. For example, modern database applications allow users to store, organize and manipulate data. Modern electronic word processing applications allow users to prepare a variety of useful documents. Modern spreadsheet applications allow users to enter, manipulate, and organize data. Modern electronic slide presentation applications allow users to create a variety of slide presentations containing text, pictures, data or other useful objects.

To assist users to locate and utilize functionality of a given software application, for example, a database application, a user interface containing a plurality of generic functionality controls is typically provided along an upper, lower or side edge of a displayed workspace in which the user may enter, copy, manipulate and format text or data. Such functionality controls often include selectable buttons with such names as "file," "edit," "view," "insert," "format," and the like. Typically, selection of one of these top-level functionality buttons, for example "insert," causes a drop-down menu to be deployed to expose one or more selectable functionality controls associated with the top-level functionality, for example, "table" under a top-level functionality of "insert."

After a user selects a desired functionality control, or if the user moves the mouse cursor to a different location, the drop-down menu typically disappears. If the user determines that a functionality of the first drop-down menu was the desired functionality, the user must remember which top-level functionality was selected, reselect that functionality and then find the desired functionality control all over again. Accordingly, in order to use the functionality of a given software application, the user must know the desired functionality is available under one of the selectable buttons, or the user must select different top-level functionalities until the desired specific functionality is located in one of many deployed menus. Such a method of searching for desired functionality is cumbersome and time-consuming, particularly for less experienced users, and when new functionality is added by developers of the software application, the new functionality may never be utilized unless the user is somehow educated as to its existence.

In addition, often a given user desires to customize a user interface provided by a given software application, or a given user often desires to utilize a legacy user interface of a previous version of a software application with which one or more data objects or documents has been developed or edited. If the user is not able to customize the user interface, the utilization experience may be greatly diminished. If the user is not able to utilize legacy user interfaces, the user may be required to expend significant resources updating data objects or documents to comply with later versions of the software application.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing an improved user interface for displaying selectable software functionality controls of a database application and for presenting logical groupings of particular functionality controls associated with a selected top-level functionality. Generally, aspects of the present invention provide for organization of the functionality of a database application into task-based modes. The modes are associated with tabs in a ribbon-shaped user interface, and the tabs are labeled with descriptive text associated with different functionality modes or tasks. Underneath a row of top-level functionality tabs, functionalities associated with a given top-level functionality tab are presented in logical groupings. Selection of a particular tab switches modes of the user interface to present controls for functionalities associated with the selected tab.

According to one embodiment of the invention, methods and systems for providing functionality from a software application via an improved user interface are provided. A plurality of functionalities available from a database application is organized according to one or more tasks that may be performed with the database application. A user interface tab for each of the one or more tasks is provided in the user interface. Upon receiving an indication of a selection of a given user interface tab, one or more selectable functionality controls are provided in the user interface for selecting one or more functionalities organized under a given task associated with the selected user interface tab.

According to another embodiment of the invention, upon receiving a selection of a given data object, for example, a database report, the one or more selectable functionality controls is/are dynamically replaced in the user interface with one or more selectable functionality controls that are relevant to the selected object so that the user interface becomes contextually relevant to the selected object.

According to another embodiment, an application programming interface (API) method may be utilized for submitting customizations of the user interface. In addition, a property or condition may be set on the user interface to allow utilization of a legacy or previous version of a user interface so that backward compatibility is provided with data objects or documents prepared using legacy or previous versions of an associated software application.

These and other features and advantages will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to an improved user interface for displaying selectable software functionality controls of a database application. As will be described in detail below, when one task-based functionality tab is selected from the user interface of the present invention, selectable functionality controls provided by the associated database application for performing aspects of a task related to the selected task-based functionality tab are presented in a ribbon-shaped user interface above a workspace in which the user is entering or editing data. Upon selection of a different task-based functionality tab, the presentation of functionality controls associated with the first task is removed, and selectable functionality controls associated with the second selected task-based functionality tab are presented in the user interface. The selectable functionality controls presented in the user interface are grouped into logical groupings for more efficient utilization. An extensibility model is provided for allowing users to develop and use customized user interfaces and to allow utilization of legacy user interfaces.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
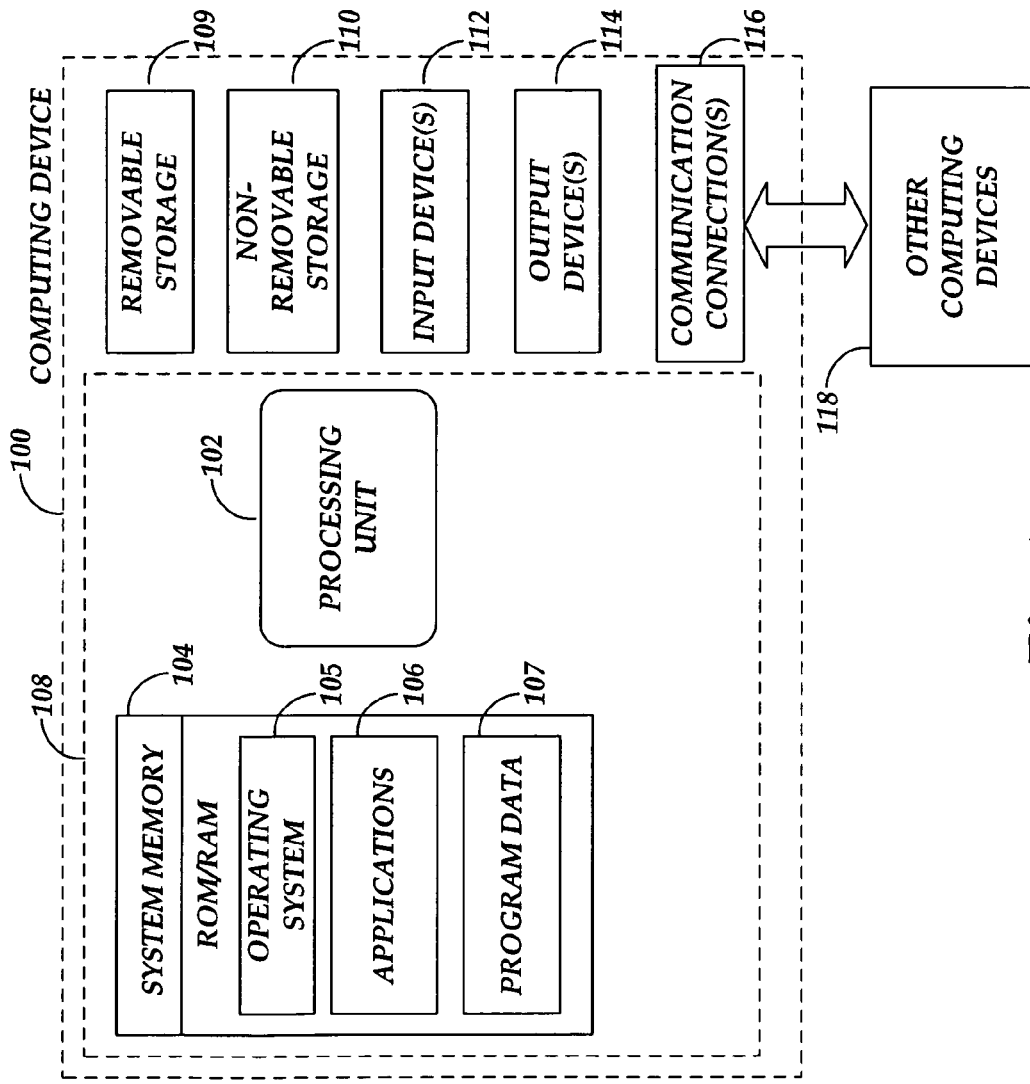
FIG. 1 is a block diagram showing the architecture of a personal computer that provides an illustrative operating environment for embodiments of the present invention.

Referring now to the drawings, in which like numerals refer to like elements through the several figures, aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the invention includes a computing device, such as computing device 100. In a basic configuration, the computing device 100 typically includes at least one processing unit 102 and system memory 104. Depending on the exact configuration and type of computing device, the system memory 104 may be volatile (such as RAM), nonvolatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications 106 and may include program data 107. This basic configuration is illustrated in FIG. 1 by those components within dashed line 108.

According to embodiments of the invention, the application 106 may comprise many types of software applications, such as database applications, word processing applications, spreadsheet applications, slide presentation applications, and the like. The application 106 may also include a multiple-functionality software application for providing many types of functionalities. Such a multiple-functionality application may include a number of program modules, such as a word processing program, a spreadsheet program, a slide presentation program, a database program, and the like. An example of such a multiple-functionality application is OFFICE™ manufactured by MICROSOFT CORPORATION. According to embodiments of the present invention, the application 106 is illustrative of a database application with which data may be stored, maintained manipulated and processed. An example of such a database application 106 is ACCESS® manufactured by MICROSOFT CORPORATION.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
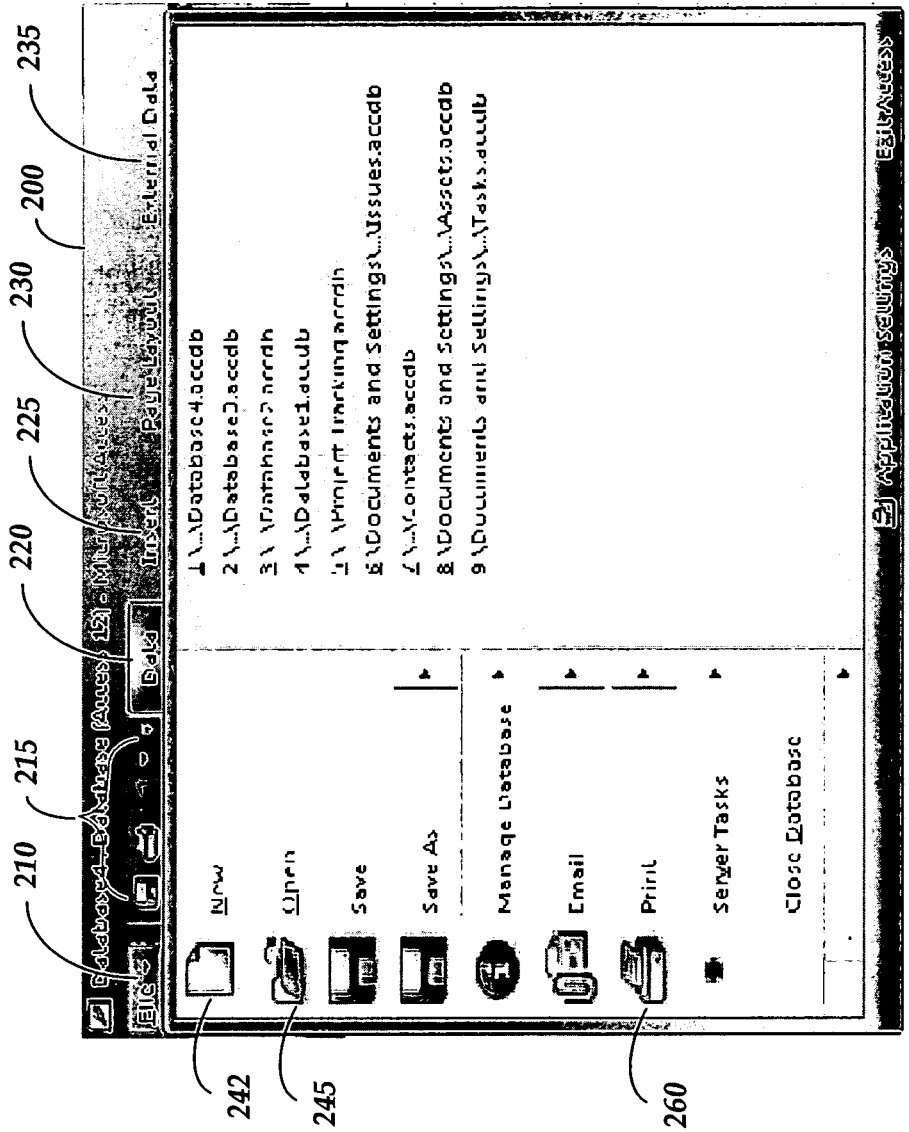
FIG. 2 is an illustration of a computer screen display showing a ribbon-shaped user interface for displaying task-based top-level functionality tabs and for displaying a plurality of functionalities available under a selected file menu control.

FIG. 2 is an illustration of a computer screen display showing a ribbon-shaped user interface of a database application 106 for displaying task-based top-level functionality tabs and for displaying a plurality of functionalities available under a selected top-level functionality tab. As will be described in detail herein, the display of available functionality controls in the user interface of the present invention is dynamically changed based on a selected mode of operation or task of the database application or based on a context of a selected data object. As should be appreciated, the user interface 200 modes of operation and layouts described below are for purposes of example only and are not limiting of the additional modes of operation and additional displays of logical groupings of functionality controls that may be provided in accordance with embodiments of the present invention.

According to one embodiment, a first selectable control 210 is displayed consistently across all modes of the user interface 200 for providing a plurality of standard application functions such as the "New" file control 242, the "Open" file control 245, the "Save" control, the "Print" control, and the like. That is, selection of the "File" control 210 causes a display of the selectable controls 242, 245, 260 as illustrated in FIG. 2. Adjacent to the "File" control 210 is a quick action toolbar 215 for providing one or more standard functionalities such as save, print, undo, help, and the like for quick selection by a user. As will be illustrated in FIGS. 2-18, the quick action toolbar 215 may be located at different locations on the user interface, for example, top, bottom, top right, bottom right, etc. As should be appreciated, selection of one of the functionality controls from the quick action toolbar 215 allows for the quick execution of the desired functionality without the need for deploying a secondary functionality menu or without selecting a different top-level functionality control 220, 225, 230, 235, 240, described herein.

According to embodiments of the present invention, selection of one of the top-level task-based functionality tabs 220, 225, 230, 235, 240 (illustrated in FIG. 3) changes a display mode of the user interface 200 such that the user interface 200 dynamically displays selectable controls for one or more functionalities of the associated database application 106 such that the displayed functionality controls are associated with the selected tab and associated functionality mode. For example, as described below, selection of the "Data" tab 220 places the user interface 200 in a "data" mode, and selectable functionality controls for providing data functions of the database application 106 are displayed immediately beneath the row of top-level task-based tabs. Similarly, selection of the "Insert" tab 225 causes a display of one or more selectable functionality controls for providing insert functionalities of the database application 106 immediately beneath the row of task-based tabs. Selection of the "Page Layout" tab 230 causes a display of one or more functionality controls for providing page layout functionality of the database application 106, and so on as described herein. As should be appreciated, the task-based tabs 210-235, illustrated in FIG. 2, are for purposes of illustration only and are not restrictive of the numerous additional task-based tabs that may be displayed in the user interface 200 for causing a display of selectable functionality controls for a given task or mode enabled by the associated database application 106.

According to an embodiment, if a focus is temporarily received on a second top-level task-based tab, for example, the "Insert" tab, described below, the user interface 200 may be dynamically changed to temporarily show the logical groupings of functionality controls that will be populated in the user interface if the focused-on tab is actually selected. Upon cessation of the focus (e.g., mouse-over focus) on the second user interface tab, the logical groupings of functionality controls previously displayed are re-displayed in the user interface. Thus, a "preview" of controls associated with a given tab or mode of operation may be obtained. According to one embodiment, if during the "preview" deployment of the second set of controls a given control is selected, the functionality of the selected control is applied to a selected data object. Once application of the selected functionality is done, the "preview" deployment is dismissed and a display of the originally deployed controls is returned unless a selection of the second task-based tab is received to persist the display of the second set of controls in the user interface. Alternatively, selection of one of the "temporarily" displayed controls may cause a persistent display of the second set of controls as if the second task-based tab was selected.

Figure 3:
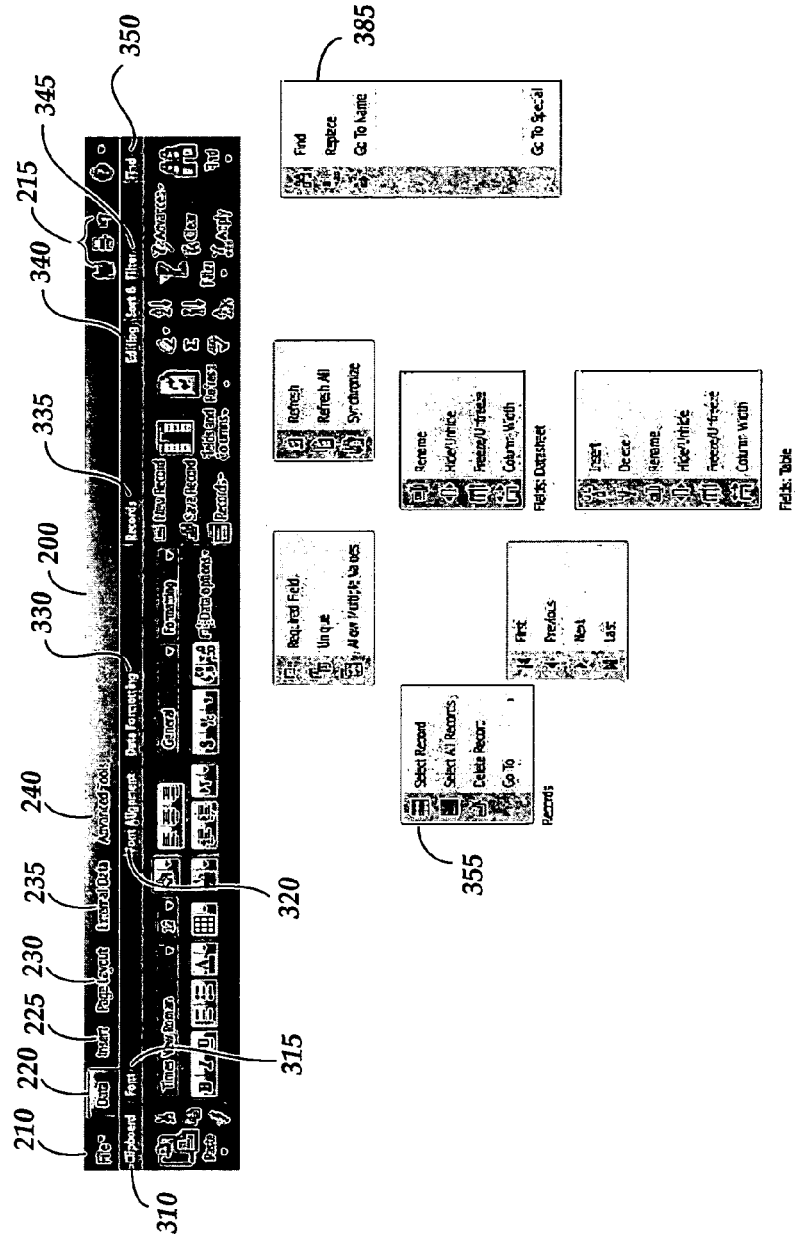
FIG. 3 is an illustration of a computer screen display showing a ribbon-shaped user interface for displaying task-based top-level functionality tabs and showing a selected Data tab for providing commands that are common across a number of data objects in a database application.

FIG. 3 is an illustration of a computer screen display showing a ribbon-shaped user interface for displaying task-based top-level functionality tabs and showing a selected Data tab for providing commands that are common across a number of data objects in a database application. According to an embodiment these commands are advantageous for working with (e.g., manipulating) data in a table and/or for committing data to a table. Upon selection of the "Data" tab 220, a selectable functionality control section immediately underneath the row of task-based tabs 210-240 is dynamically deployed for displaying selectable functionality controls associated with the selected tab 220. According to embodiments of the present invention, when a particular tab, for example, the "Data" tab 220 is selected, functionality available from the associated database application for performing the selected task, or associated with the selected mode of operation, for example, data operations, is displayed beneath the row of task-based tabs in one or more logical groupings of functionality controls. The functionality controls displayed in the one or more logical groupings of controls represent a subset of the overall functionality of the associated database application 106 where the subset is associated with a mode of operation of the database application associated with the selected tab, for example, a data mode, insert mode, or page layout mode.

Referring to FIG. 3, a first logical grouping of controls 310 is displayed under a heading "Clipboard." According to embodiments of the present invention, the clipboard section 310 may include such selectable controls as a "Cut," "Copy," "Paste," "Select All," etc. for providing clipboard-type functionalities for use on one or more data objects. Adjacent to the clipboard section 310, a second logical grouping 315 is presented under the heading "Font" for providing font functionalities for use with one or more data objects. A third logical grouping 320 is provided under the heading "Font Alignment" for providing selectable functionality controls for applying font alignment properties to one or more data objects. A next logical grouping of functionality controls 330 is displayed under the heading "Data Formatting" for providing one or more selectable controls for applying data formatting properties to one or more selected objects. Additional logical groupings of functionality controls 335, 340, 345 and 350 provide groupings of selectable functionality controls for data records, data editing, data sorting and filtering, and data find functionality, respectively. As should be appreciated, the logical groupings of functionality controls illustrated in FIG. 3 are for purposes of illustration only and are not limiting of additional functionality controls and different arrangements of functionality controls that may be provided in logical groupings under the row of task-based tabs 210-240 upon selection of a given task-based tab.

According to one embodiment, once a top-level task-based tab 210-240 is selected, and the associated logical groupings of functionality controls are deployed, as illustrated in FIG. 3, the deployed logical groupings of functionality controls remain deployed in the user interface 200 until the user interface 200 is placed into a different operating mode associated with a different top-level task of the database application 106 by the selection of a different task-based tab 210-240 or until the context of the user interface is changed relative to a context of one or more selected data objects, as described below with reference to FIGS. 9-18.

Figure 4:
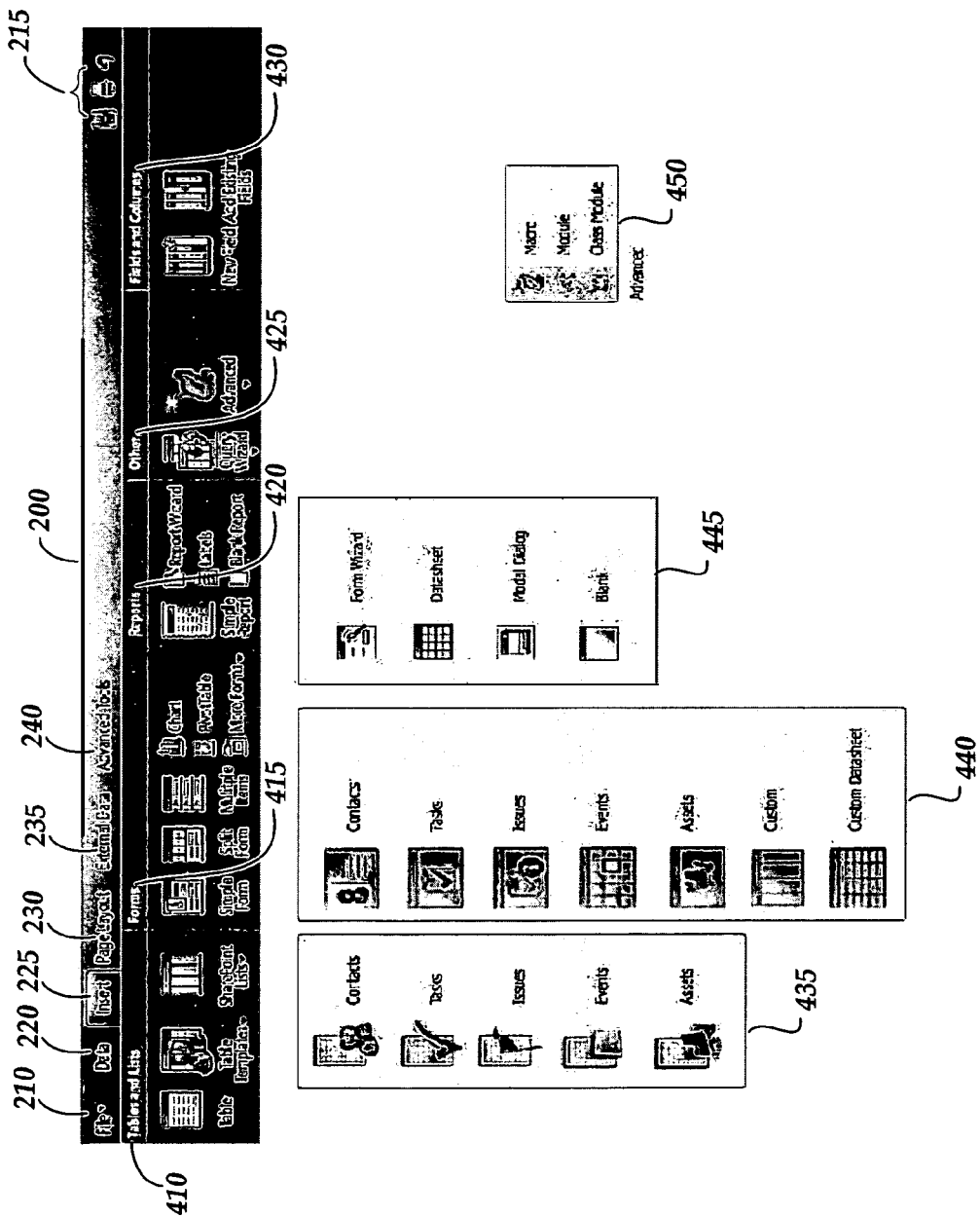
FIG. 4 illustrates a computer screen display showing the user interface illustrated in FIG. 3 and showing a selected Insert tab for providing commands for new objects into a database file.

FIG. 4 illustrates a computer screen display showing the user interface illustrated in FIG. 3 and showing a selected Insert tab for providing commands for new objects into a database file. According to an embodiment, these commands may be used for inserting new tables, forms, reports, queries, macros and modules into a database. Upon selection of the "Insert" tab 225, a different set of logical groupings of functionality controls is deployed for providing access to functionalities of the associated database application 106 associated with an insert task or mode of operation. As illustrated in FIG. 4, a first logical grouping of controls 410 is provided under the heading "Tables and Lists." As should be appreciated, the selectable controls displayed under the "Tables and Lists" logical grouping 410 allow for selectively inserting data tables and data lists associated with one or more data objects. A second logical grouping 415 is deployed under the heading "Forms" and provides one or more functionality controls for inserting one of different types of forms into a given database data object. Other logical groupings of functionality controls under the "Insert" tab 225 include the "Reports" grouping 420, the "Other" grouping 425, and the "Field and Columns" grouping 430. As illustrated in the lower portion of FIG. 4, upon selection of a given functionality control in one or more of the logical groupings of controls, one or more galleries of additional functionality controls 435, 440, 445, 450 may be provided for displaying additional controls for inserting one or more types of data structuring objects, such as tables, lists, forms, reports, and the like.

Figure 5:
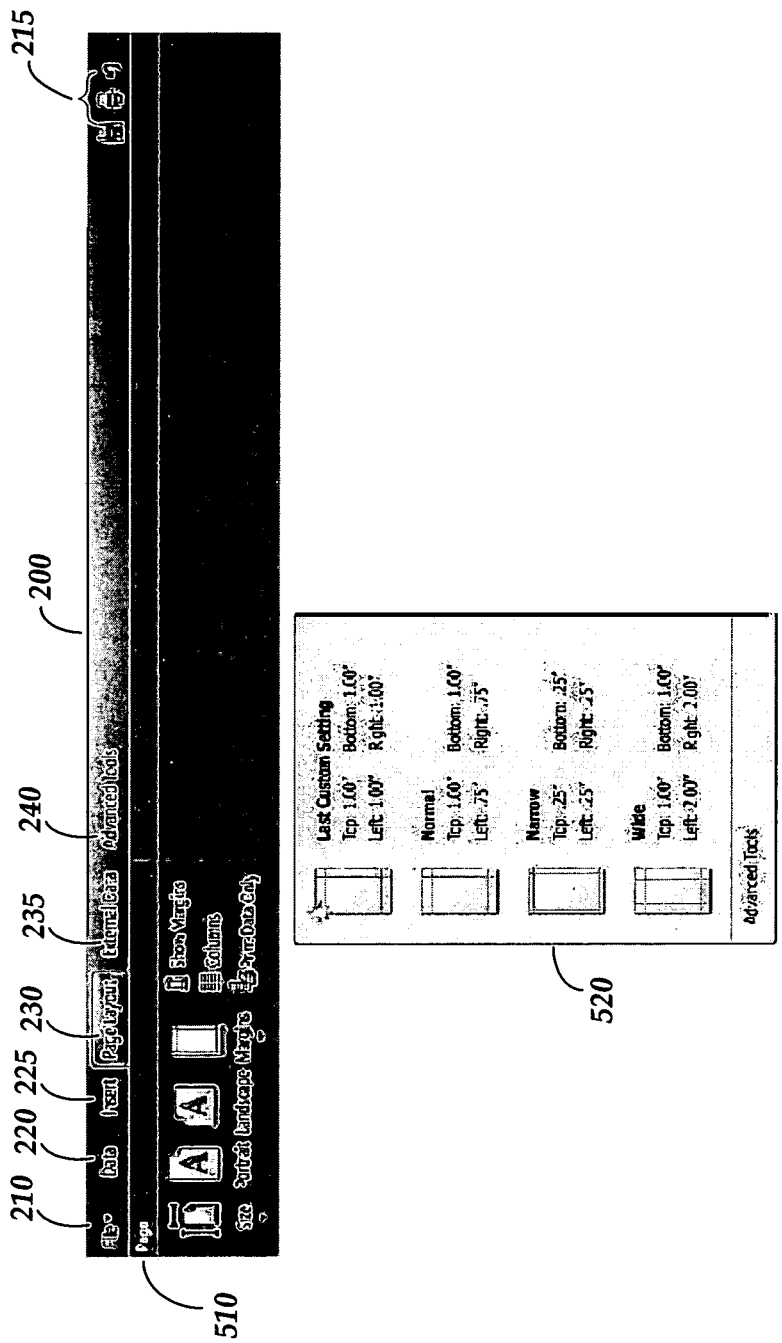
FIG. 5 illustrates a computer screen display showing the user interface illustrated in FIG. 3 and showing a selected Page Layout tab for providing commands for affecting how a given data in a particular object is displayed.

FIG. 5 illustrates a computer screen display showing the user interface illustrated in FIG. 3 and showing a selected Page Layout tab for providing commands for affecting how a given data in a particular object is displayed. Upon selection of the "Page Layout" tab 230, one or more logical groupings of functionality controls is deployed underneath the row of task-based functionality tabs 210-240. A first logical grouping of functionality controls 510 is deployed under the heading "Page" and provides selectable controls for applying page layout functionality of the associated database application 106 to one or more data objects available to the database application 106. For example, controls are provided for setting page margins, setting page display properties, and setting page display sizes. Beneath the logical grouping of controls 510 is deployed a gallery of controls 520 for providing one or more preformatted page layout properties to a given database data object. For example, a user may select one of the illustrated page layout formats from the gallery of controls 520 for having the associated layout properties automatically applied to a given data object. For example, if the "Normal" control is selected, the properties associated with the "Normal" layout, including the margin widths on the top, bottom, left and/or right, automatically will be applied to a selected data object.

As described above with reference to FIG. 3, once a given task-based tab 210-240 is selected, and an associated one or more logical groupings of functionality controls is/are deployed, the deployed one or more logical groupings of functionality controls remains deployed until the mode of operation of the user interface 200 is changed by selection of a different task-based tab 210-240. As should be appreciated, a default operating mode, for example, "data" mode, may be automatically deployed along with its associated logical groupings of functionality controls upon launching an instance of the associated database application 106.

Figure 6:
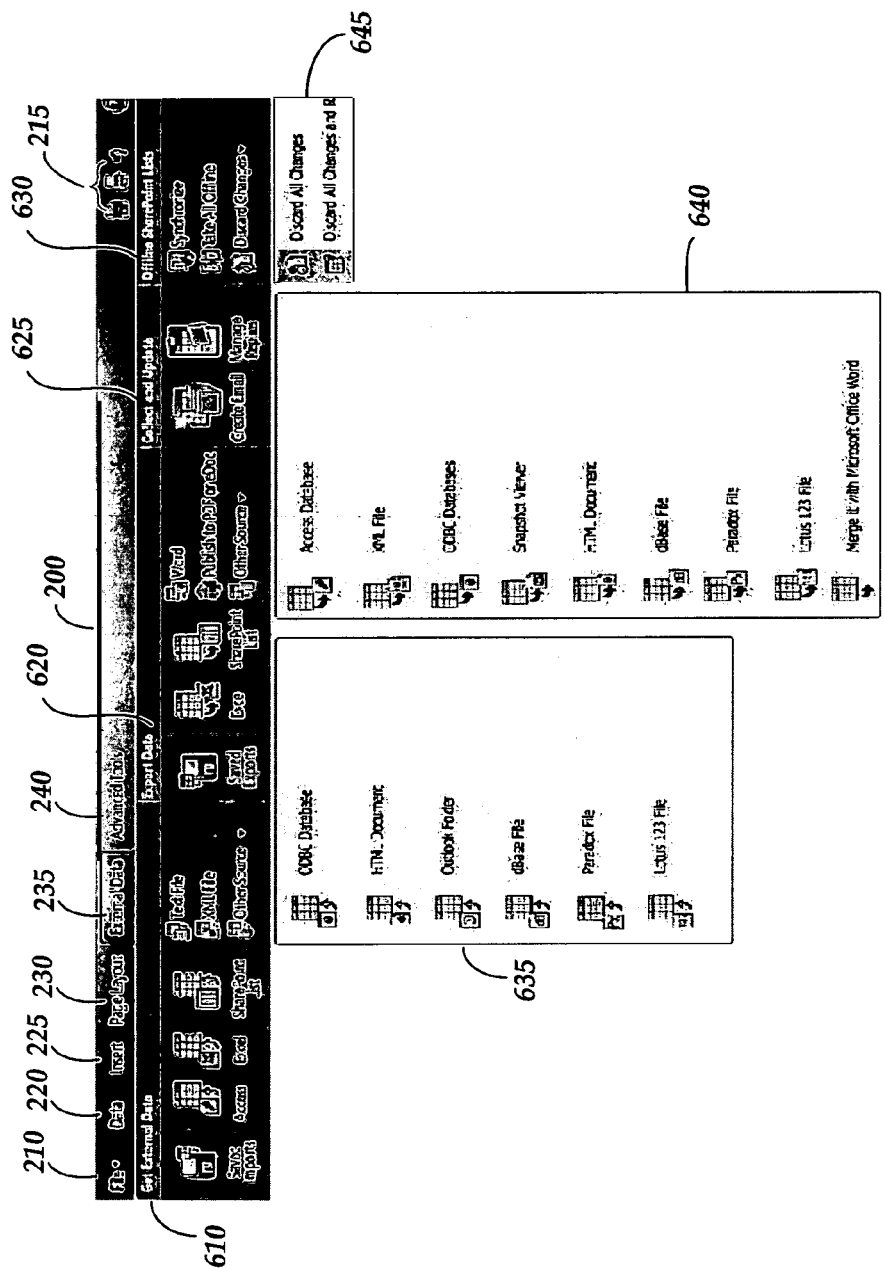
FIG. 6 illustrates a computer screen display showing the user interface illustrated in FIG. 3 and showing a selected External Data tab for providing commands for importing data from a source outside an in-use database.

FIG. 6 illustrates a computer screen display showing the user interface illustrated in FIG. 3 and showing a selected External Data tab for providing commands for importing data from a source outside an in-use database. Selection of the "External Data" tab 235 places the user interface 200 in a mode for providing functionality of the associated database application 106 in association with external data. Upon selection of the "External Data" tab 235, a plurality of logical groupings of functionality controls is deployed underneath the row of task-based tabs 210-240 that are associated with a task or mode of operation related to external data. A first logical grouping of controls 610 is provided under the heading "Get External Data" and provides one or more functionality controls for causing the associated database application 106 to retrieve external data from a number of sources, including saved data, data maintained in a shared database, data maintained or enabled from a different software application, and the like.

Referring still to FIG. 6, a second logical grouping of functionality controls 620 is deployed under the heading "Export Data" and provides one or more functionality controls for causing the associated database application 106 to export data from the database application 106 to an external data source or data site. A third logical grouping of functionality controls 625 is deployed under the heading "Collect and Update" and includes one or more functionality controls for handling external data via electronic mail transmission and management. A next logical grouping of functionality controls 630 is deployed under the heading "Offline Sharepoint Lists" and provides one or more functionality controls for processing data in an offline environment and for synchronizing data processed in an offline environment back to a server-based database once an online connection between a client database application and a server-based database application is reestablished.

Underneath the logical groupings of functionality controls are additional functionality controls that may be provided under the logical groupings of functionality controls where additional controls are available or desired. For example, the dropdown 645 provides additional functionality controls for processing data in an offline environment. The dropdowns 635 and 645 contain additional functionality controls for obtaining external data and for exporting data. As should be appreciated, the dropdowns 635, 640, 645 may be deployed anytime the logical groupings 610, 620, 625, 630 do not include all available functionality controls under each of the respective logical grouping headings. As should be appreciated, the logical groupings and associated functionality controls illustrated in FIG. 6 are for purposes of example only and are not limiting of the number of different functionality controls and logical groupings of functionality controls that may be deployed under the "External Data" tab 235.

Figure 7:
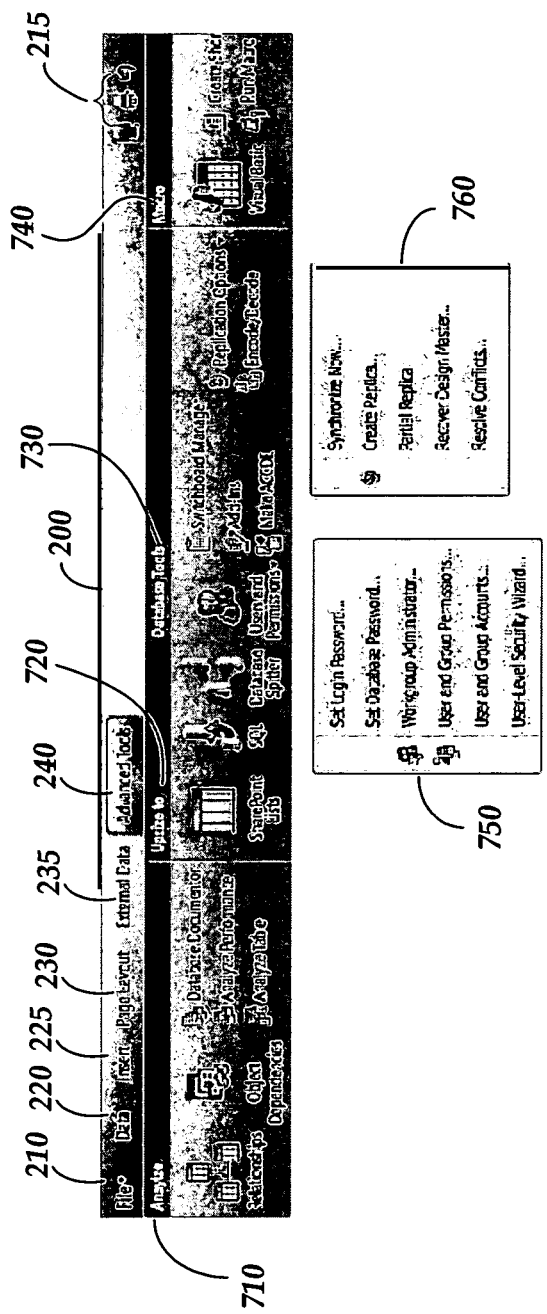
FIG. 7 illustrates a computer screen display showing the user interface illustrated in FIG. 3 and showing a selected Advanced Tools tab is for providing commands for performing maintenance on a given database.

FIG. 7 illustrates a computer screen display showing the user interface illustrated in FIG. 3 and showing a selected Advanced Tools tab is for providing commands for performing maintenance on a given database. Upon selection of the "Advanced Tools" tab 240, a number of logical groupings of functionality controls 710, 720, 730, 740 are deployed for providing functionality controls for obtaining advanced features, such as database analysis, upsize functions and additional database tools, including database security functions. For example, the logical grouping of functionality controls 710 deployed under the heading "Analyze" provides advanced data analysis tools. The logical grouping 720 under the heading "Upsize To" provides one or more advanced tools for upsizing data to a variety of different database systems. The logical grouping 730 under the heading "Database Tools" provides a number of advanced tools for operating on the database application 106 and associated data. The dropdown or deployed menus 750, 760 illustrate additional functionality controls not deployed in the logical groupings, including additional security functions illustrated in the menu 750 and data synchronization functions illustrated in the menu 760.

Figure 8A:
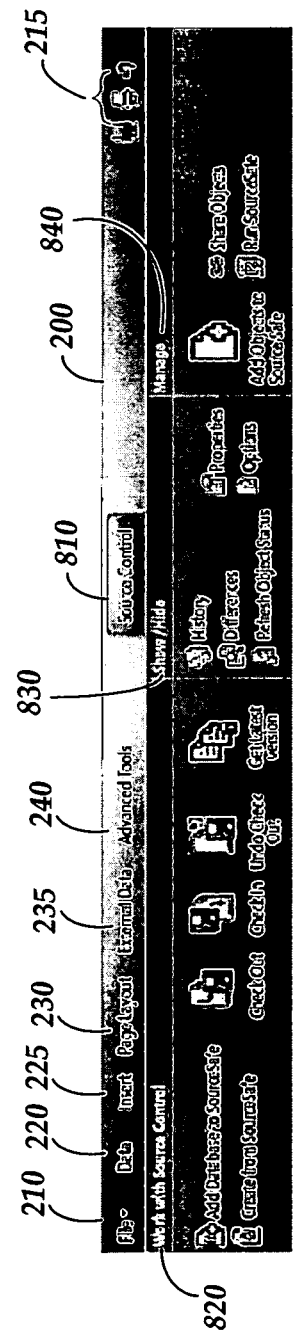
FIG. 8A illustrates a computer screen display showing the user interface illustrated in FIG. 3 and showing a selected Source Control tab for providing commands for utilizing functionality of a third party add in application.

FIG. 8A illustrates a computer screen display showing the user interface illustrated in FIG. 3 and showing a selected Source Control tab for providing commands for utilizing functionality of a third party add-in application. According to one embodiment, the Source Control tab may be provided by a third party add-in, such as Visual SourceSafe (VSS), and is only surfaced when add-in application is installed on the computer 100. Upon a selection of the "Source Control" tab 810, a variety of functionality controls are deployed in one or more logical groupings of functionality controls 820, 830, 840. For example, a first logical grouping of controls 820 is deployed under the heading "Work with Source Control" and provides functionalities, particularly useful to database application developers, for designing particular implementations of data input and output from a client application to a data source. A second logical grouping of functionality controls 830 is deployed under the heading "Show/Hide" and provides one or more functionality controls for setting display properties on one or more data objects. A third logical grouping of controls 840 is deployed under the heading "Manage" and provides one or more functionality controls for managing the operation of, relation between, and communication between various data objects.

Figure 8B:
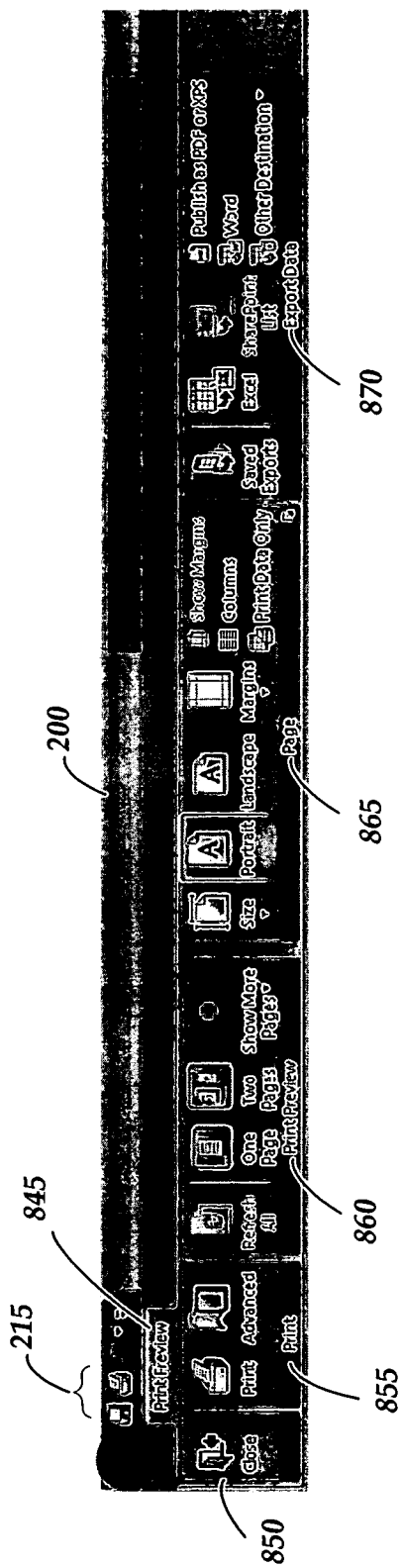
FIG. 8B is an illustration of a computer screen display showing a ribbon-shaped user interface for displaying task-based top-level functionality tabs and showing a Print Preview tab for providing commands for affecting print settings for a selected database object.

FIG. 8B is an illustration of a computer screen display showing a ribbon-shaped user interface for displaying task-based top-level functionality tabs and showing a Print Preview tab for providing commands for affecting printing settings for a selected database object. As illustrated in FIG. 8B, a number of logical groupings of controls, 850, 860, 865, 870 are provided for choosing different print settings for an associated database object. For example, the logical grouping 865 contains controls for selectively printing a database object in "Portrait" orientation or "Landscape" orientation.

The user interface modes of operation described above with reference to FIGS. 2-8 provide particular deployments of functionality controls in association with particular modes of operation, for example, insert, page layout, external data, advanced tools, etc. According to embodiments of the present invention, the user interface 200 may be populated with additional logical groupings of functionality controls based on the context of a given selected data object so that the user interface 200 provides logical groupings of functionality controls that immerse the user with functionality responsive to a particular data object. For example, if the user is in a particular mode of operation, for example, upon selection of the "Data" tab 220, and the user selects a particular data object, for example, a table object, the logical groupings of functionality controls deployed in the user interface 200 may be dynamically changed so that functionality controls particular to features of the associated database application for operating on the selected table object are deployed in the user interface 200. Thus, typical features required for processing the selected table object are automatically deployed in the user interface 200 for use by the user. If the selection of a given database object is terminated, or if the mouse cursor or other electronic pointer is focused on an area of the user interface not associated with a particular database object, the previously deployed user interface 200, for example, one the user interfaces illustrated in FIGS. 2-8 above, is redeployed as it was prior to deployment of the contextual user interface associated with the selected database object.

According to embodiments, once the user selects a different data object, the logical grouping of functionality controls may be dynamically changed again so that functionality controls under the selected mode of operation are once again changed in association with the different selected data object. For example, if the user selects a report object, the functionality controls deployed in the user interface 200 may be dynamically changed so that controls associated with report features of the associated database application 106 are dynamically displayed in the user interface 200 to provide those features commonly used when operating on a database report. Thus, the user experience is enhanced because the user is not required to search for particular functionality controls associated with the selected object. Instead, upon selection of a particular data object, those functionality controls associated with those features commonly used with respect to the selected object are automatically displayed to the user.

Figure 9:
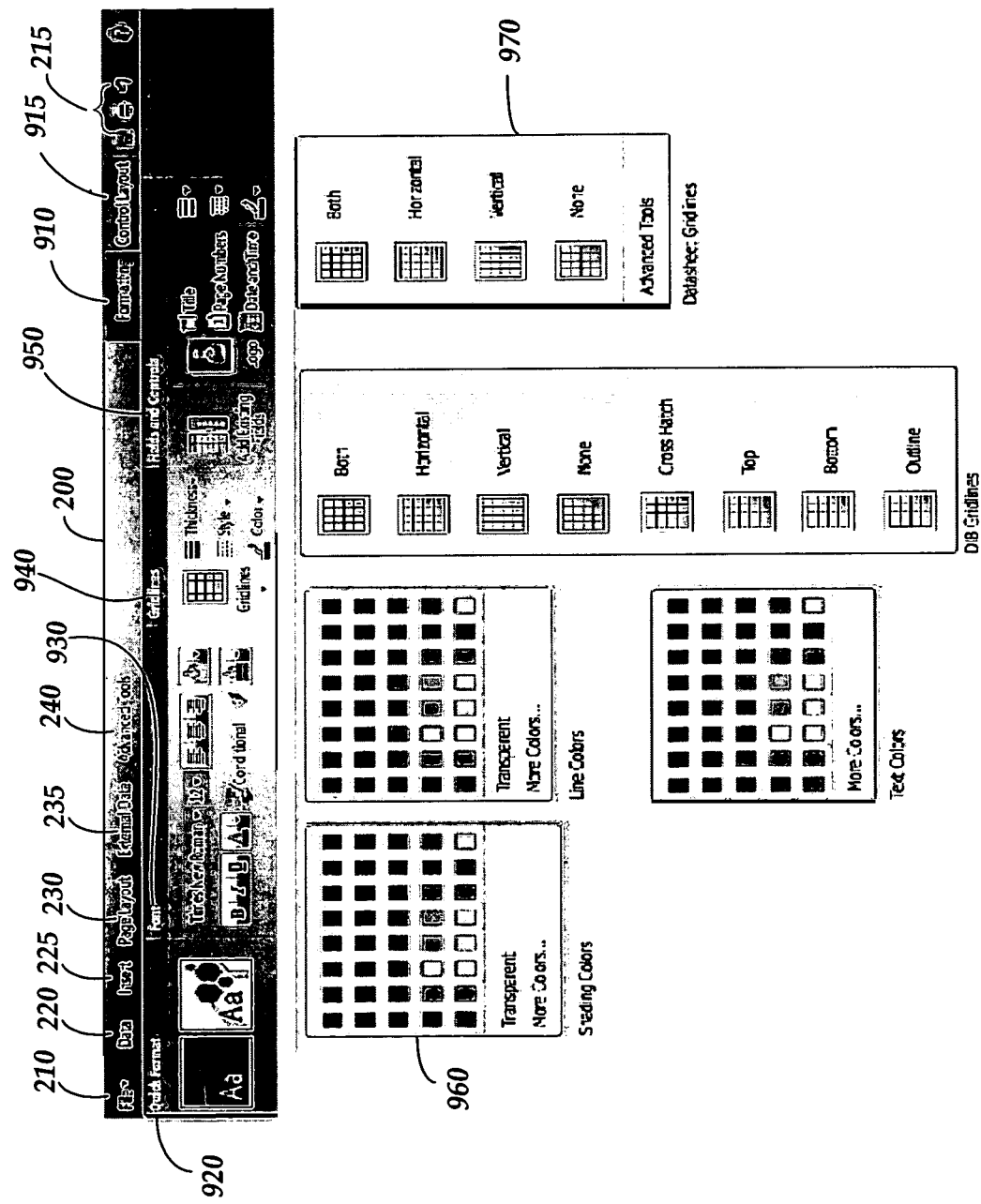
FIG. 9 illustrates a computer screen display showing the user interface illustrated in FIG. 3 and showing contextual tabs for providing commands for formatting and layout for database forms.

FIG. 9 illustrates a computer screen display showing the user interface illustrated in FIG. 3 and showing contextual tabs for providing commands for formatting and layout for database forms. According to embodiments of the present invention, these two tabs provide the functionality commands needed for building form objects in a layout mode of an associated database application. A first type of data object for which contextual user interfaces may be provided is a forms data object. Upon selection of a forms data object (i.e., a form), contextual user interface functionality may be provided for both layout and design of the selected form. Additionally, contextual user interface functionality for layout and design may also be provided for pivot chart and pivot table modes within the overall mode of forms. According to these embodiments, if a form object is selected, two additional task-based tabs 910, 915 for "Formatting" and "Control Layout" are deployed along the upper edge of the user interface 200, as illustrated in FIG. 9. If the user selects the "Formatting" tab 910, the logical groupings of functionality controls previously displayed in the user interface 200 are dynamically replaced with one or more logical groupings of functionality controls 920, 930, 940, 950 associated with applying formatting functionalities of the associated database application 106 to the selected form object.

The formatting contextual user interface provides functionality controls for quick formats, fonts, gridlines, fields and controls, and other groupings. For example, a first logical grouping of functionality controls 920 is deployed under the heading "Quick Format" for allowing a selection of one or more formatting types to the selected forms object. A second logical grouping of functionality controls 930 is deployed under the heading "Font" for providing functionality controls for applying various font properties to the selected form object. As illustrated beneath the user interface 200, one or more menus 960, 970 may be provided for displaying additional functionality controls for applying additional formatting properties to the selected form object. For example, selection of one of the gridlines controls illustrated in the menu 970 will cause an automatic application of the selected gridlines style to the selected form object. As should be appreciated, once a different data object is selected, for example, a report or table object, the functionality controls provided in the context of the previously selected form object may be replaced with functionality controls associated with the context of a subsequently selected data object.

Figure 10:
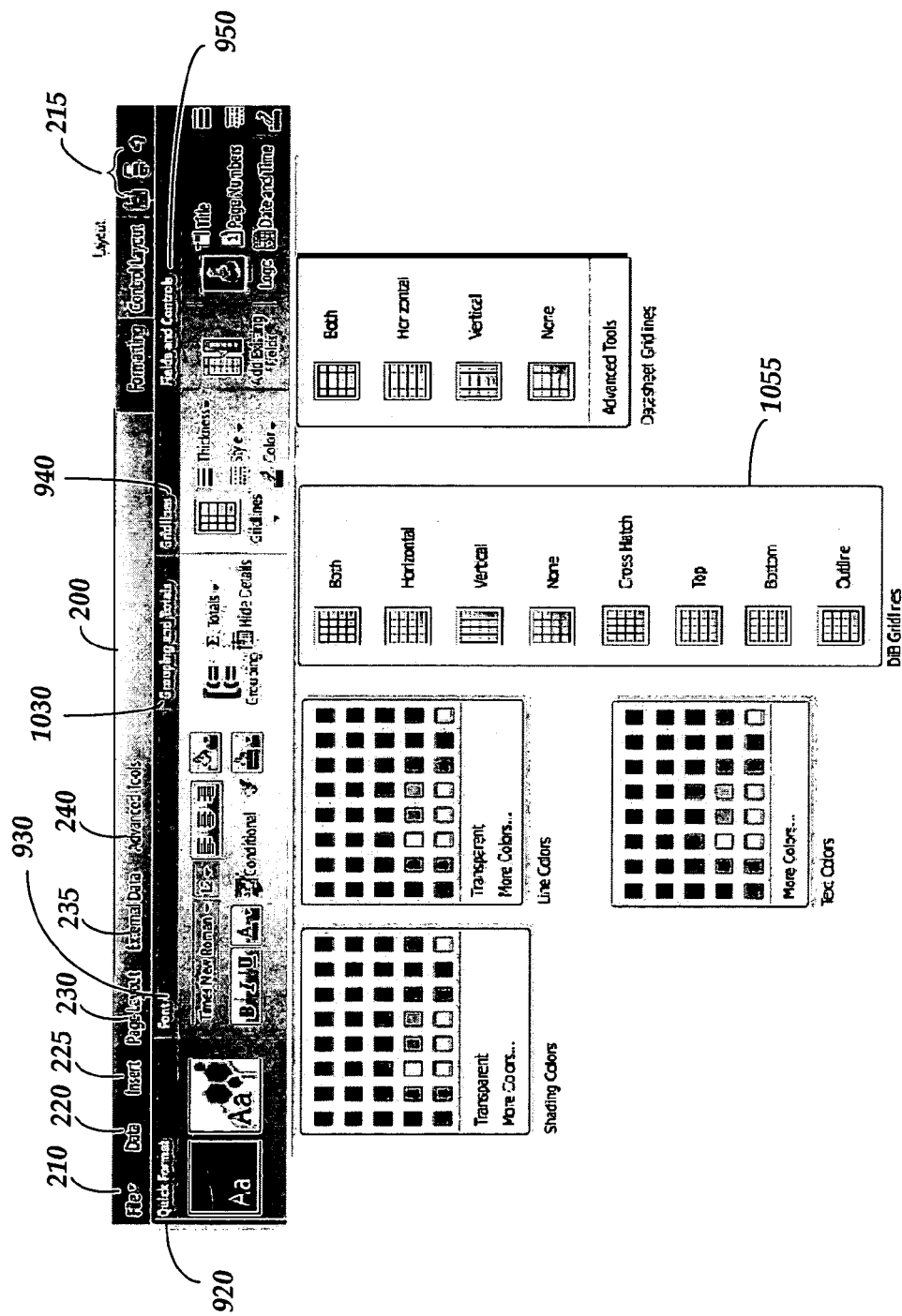
FIG. 10 illustrates a computer screen display showing the user interface illustrated in FIG. 3 and showing contextual tabs for providing commands for formatting and layout for database reports.

Referring to FIG. 10, a different version of the contextual user interface 200 illustrated in FIG. 9 is provided for a selected report object. As illustrated in FIG. 10, contextual tabs are shown for providing commands for formatting and layout for database reports. According to an embodiment, these two tabs provide the functionality commands needed for building report objects in the layout mode of an associated database application. The user interface 200 for providing layout formatting to a selected report object provides an additional logical grouping 1030 for applying "Grouping and Totals" properties to a selected report object.

Figure 11:
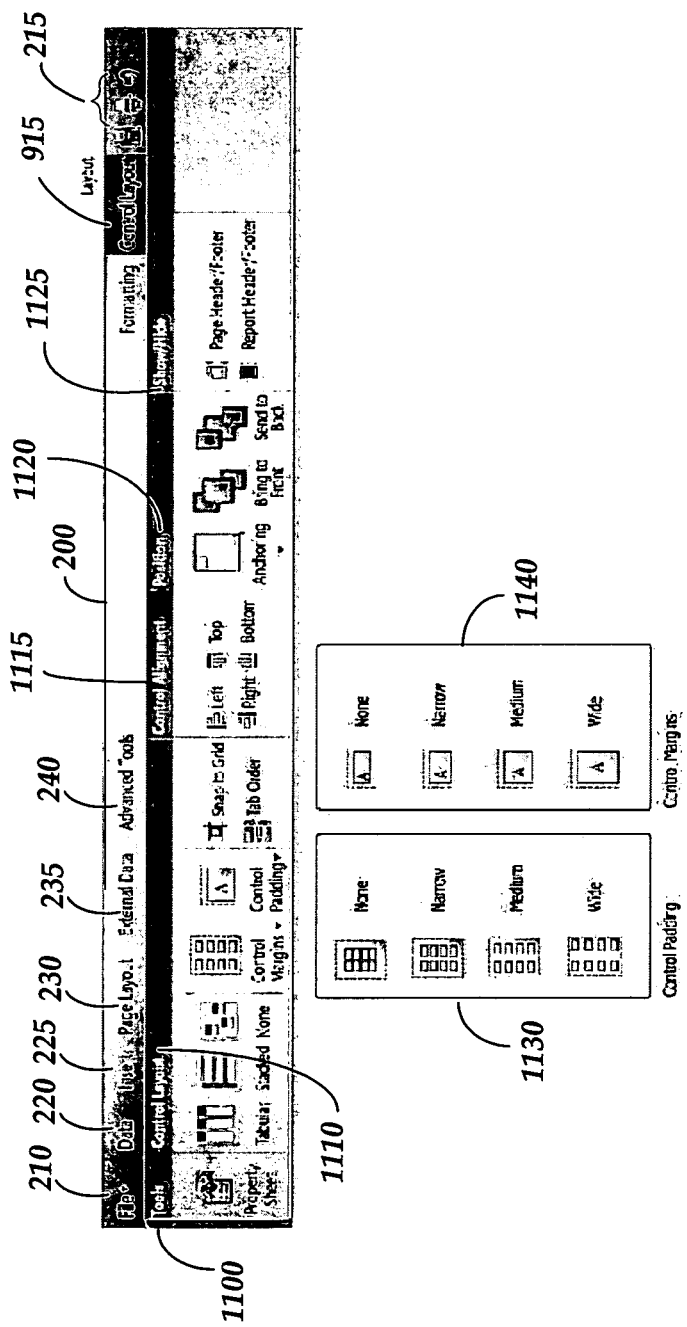
FIG. 11 illustrates a computer screen display showing the user interface illustrated in FIG. 3 and showing contextual tabs for providing commands for database form and database report layout.

FIG. 11 illustrates a computer screen display showing the user interface illustrated in FIG. 3 and showing contextual tabs for providing commands for database form and database report layout. The form and report layout tab provide functionality commands used to layout a form or report in a database application layout mode. Upon selection of the "Control Layout" tab 915, the logical groupings of functionality controls previously displayed in the user interface 200 are dynamically replaced with one or more logical groupings of controls associated with control layout properties of the selected form object. That is, the functionality controls dynamically displayed in the user interface 200 provide access to functionality of the database application 106 for allowing the user to manipulate the location, the groupings, and the orders of controls on the selected database form. As illustrated in FIG. 11, the logical groupings of functionality controls are provided under such groupings as "Tools," "Control Layout," "Alignment," "Position" and "Show/Hide" for manipulating the locations, ordering and grouping of functionality controls provided in the selected form object.

Figure 12:
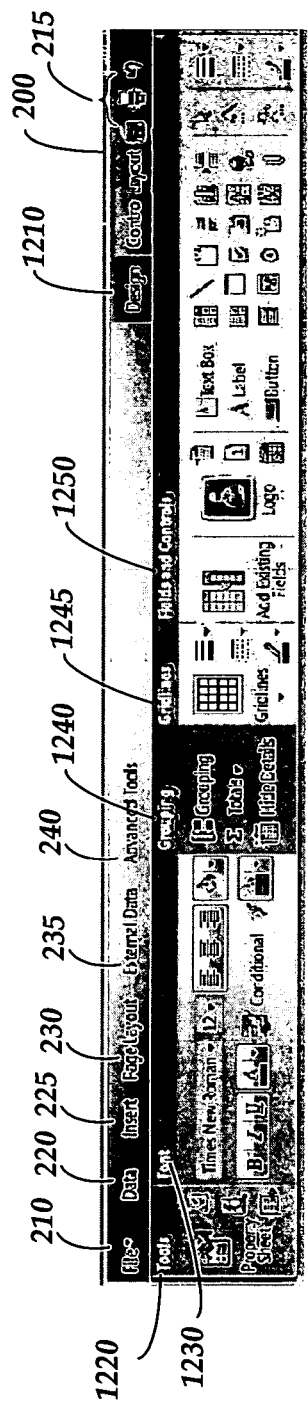
FIG. 12 illustrates a computer screen display showing the user interface illustrated in FIG. 3 and showing a contextual tab for designing a database form in a database design mode.

FIG. 12 illustrates a computer screen display showing the user interface illustrated in FIG. 3 and showing a contextual tab for designing a database form in a database design mode. The user interface illustrated in FIG. 12, includes commands/controls required for adding controls to a form object. This contextual user interface may be deployed in response to the selection of a particular data object, such as a form object, includes an additional top-level, task-based tab 1210 for applying design properties and functionalities to the selected form. In response to a selection of the "Design" tab 1210, one or more logical groupings of functionality controls are provided, including the "Tools" grouping, the "Font" grouping 1230, the "Grouping" grouping 1240, the "Gridlines" grouping 1245 and the "Fields and Controls" grouping 1250. Under these groupings, one or more functionality controls are displayed and are associated with functions of the database application 106 for applying design characteristics and properties to the selected form object.

Figure 13:
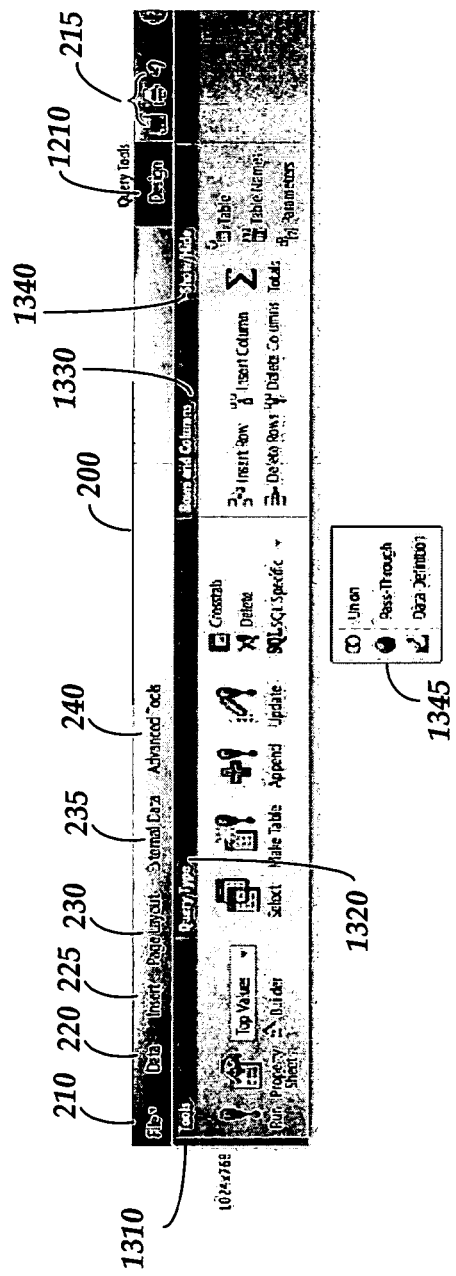
FIG. 13 illustrates a computer screen display showing the user interface illustrated in FIG. 3 and showing a contextual tab for providing commands for building a database query in a database design view.

FIG. 13 illustrates a computer screen display showing the user interface illustrated in FIG. 3 and showing a contextual tab for providing commands for building a database query in a database design view. Upon selection of a database query for editing or further development, the user interface 200 may be dynamically populated with a "Design" tab 1210 for selectively deploying one or more logical groupings of functionality controls for providing functions of the database application 106 for building a database query. Upon selection of the "Design" tab 1210, a first logical grouping 1310 provides one or more functionality controls for designing a database query. A second logical grouping 1320 is populated under the heading "Query Type" for selecting a type of database query for building or editing. Additional logical groupings 1330, 1340 provide functionality controls for applying database queries to rows and columns and for controlling the display properties of the selected database query.

Figure 14:
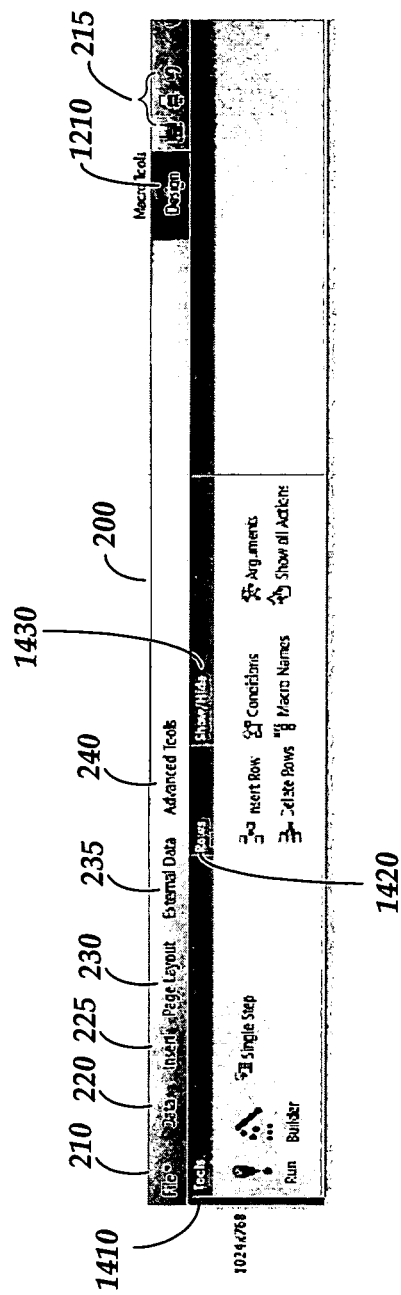
FIG. 14 illustrates a computer screen display showing the user interface illustrated in FIG. 3 and showing a contextual tab for providing commands for building a macro in a database design view.

FIG. 14 illustrates a computer screen display showing the user interface illustrated in FIG. 3 and showing a contextual tab for providing commands for building a macro in a database design view. If a macro is selected via the database application 106, the user interface 200 may be populated with one or more logical groupings of functionality controls associated with applying functions of the database application 106 for designing, building and/or editing a selected macro. As illustrated in FIG. 14, a first logical grouping of controls 1410 provides database application tools for application to a selected macro, and logical groupings 1420, 1430 provide functionality controls associated with the insertion or deletion of rows and the application of display properties associated with a selected macro.

Figure 15:
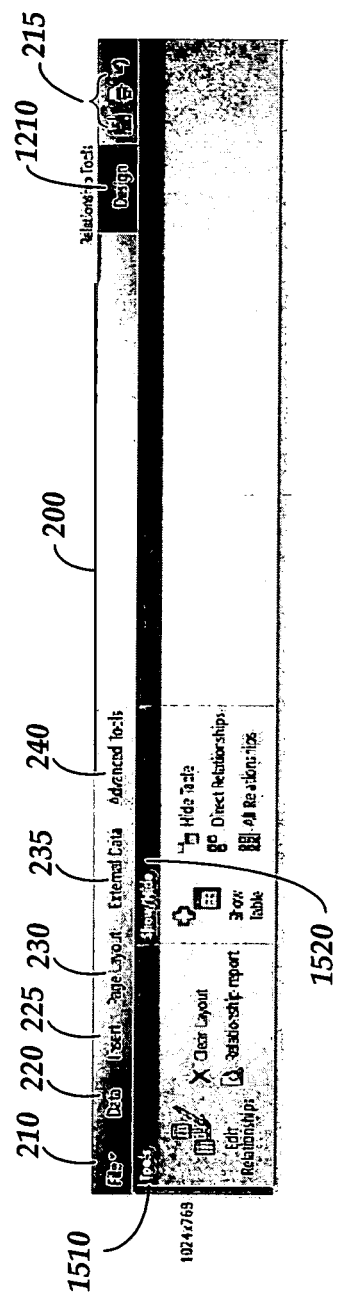
FIG. 15 illustrates a computer screen display showing the user interface illustrated in FIG. 3 and showing a contextual tab for building a relationship between tables or queries in a database design view.

FIG. 15 illustrates a computer screen display showing the user interface illustrated in FIG. 3 and showing a contextual tab for building a relationship between tables or queries in a database design view. This contextual user interface is provided upon the selection of a relationship between objects of a given database file. According to an embodiment, the user interface tab 1210 may be rendered from selecting a command on another tab, for example, the Advanced Tools tab 240. This opens a Relationship tab to provide commands for building relationships between objects and is not opened because of the context of an object. Upon selection of the "Design" tab 1210, logical groupings 1510, 1520 are provided for applying relationship tools, including editing relationships, creating relationship reports and applying display characteristics to relationships between database objects.

Figure 16:
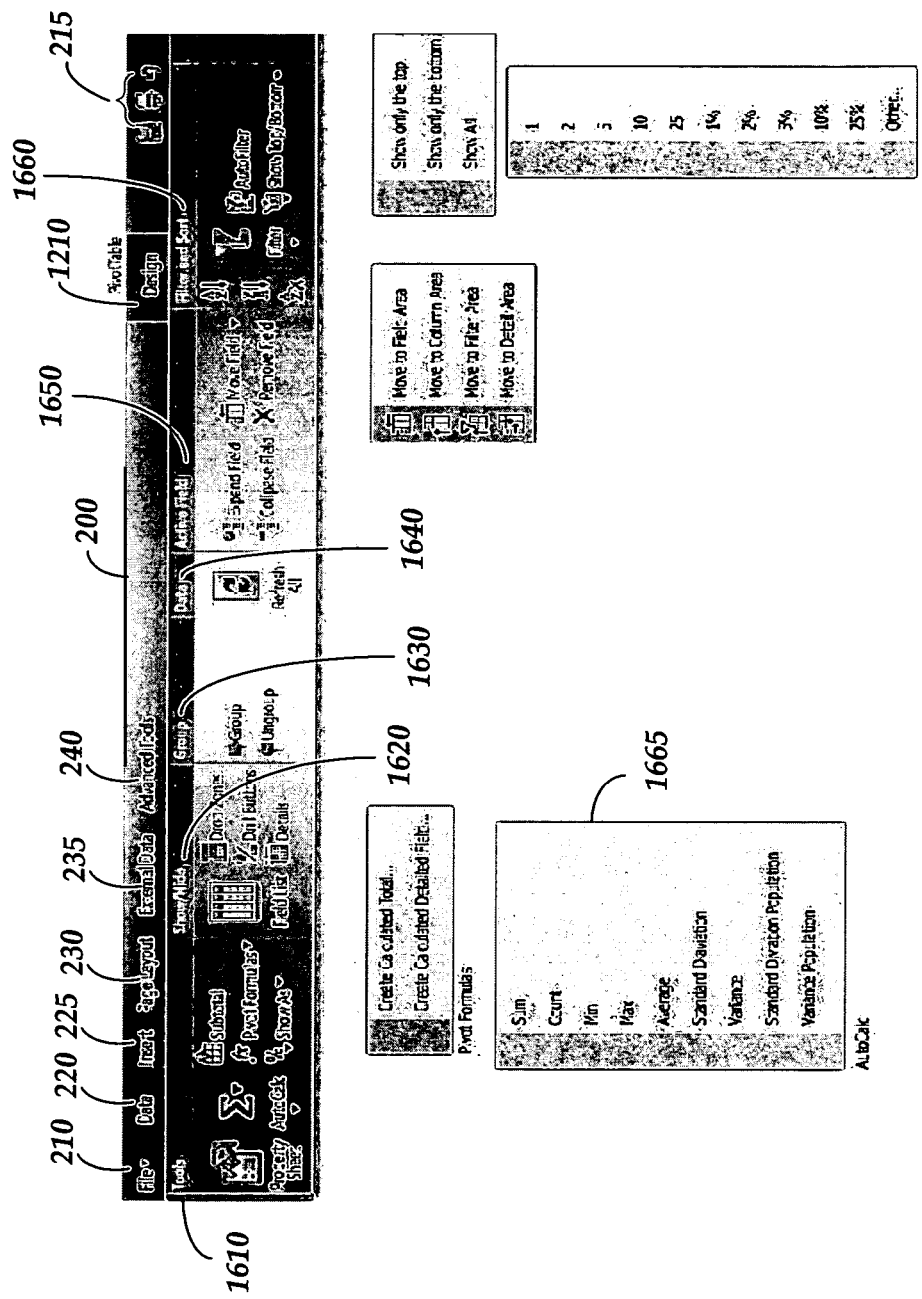
FIG. 16 illustrates a computer screen display showing the user interface illustrated in FIG. 3 and showing a contextual tab for providing commands for building a pivot table in a database design view.

FIG. 16 illustrates a computer screen display showing the user interface illustrated in FIG. 3 and showing a contextual tab for providing commands for building a pivot table in a database design view. Upon selection of a pivot table database object, the user interface 200 may be populated with the "Design" tab 1210, as illustrated in FIG. 16, and upon selection of the "Design" tab 1210, the user interface 200 is populated with one or more logical groupings of functionality controls for obtaining functionalities of the associated database application 106 for operating on a pivot table object. That is, upon selection of a pivot table object via the database application 106, the user interface 200 is automatically and dynamically populated with functionality controls for providing a user quick access to the functions of the associated database application 106 applicable to the selected pivot table object. For example, a "Tools" grouping 1610 is provided for displaying functionality controls associated with building and manipulating a pivot table object. Other logical groupings include the "Show/Hide" grouping 1620, the "Group" grouping 1630, the "Data" grouping 1640, the "Active Field" grouping 1650 and the "Field and Sort" grouping 1660. In addition, a number of menus 1665 are displayed beneath the user interface 200 for providing additional functionality controls and options available to the user for operating on the selected pivot table. As should be appreciated, the menus 1665 may be deployed in response to the selection of a given control in the user interface 200.

Figure 17:
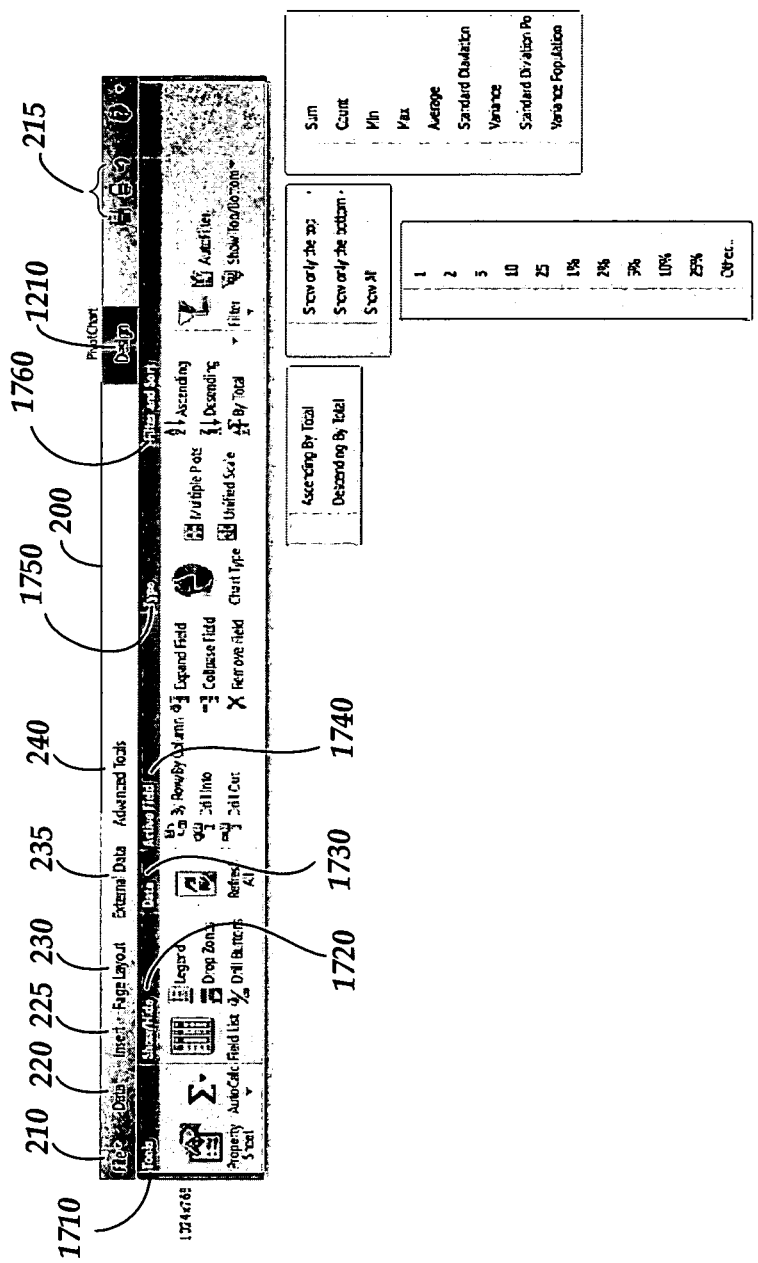
FIG. 17 illustrates a computer screen display showing the user interface illustrated in FIG. 3 and showing a contextual tab for providing commands for building a pivot chart in a database design view.

FIG. 17 illustrates a computer screen display showing the user interface illustrated in FIG. 3 and showing a contextual tab for providing commands for building a pivot chart in a database design view. The user interface 200 is illustrated containing contextual user interface functionality associated with a selected pivot chart object. Upon selection of a pivot chart object, the "Design" tab 1210 is deployed, and upon selection of the "Design" tab 1210, the logical groupings of functionality controls for applying pivot chart functions of the associated database application 106 are automatically deployed in the user interface 200 so that the user does not have to open one or more menus to search for functionality controls associated with pivot charts. As illustrated in FIG. 17, a "Tools" logical grouping 1710 is provided, a "Show/Hide" grouping 1720 is provided, a "Data" grouping 1730 is provided, an "Active Field" grouping 1740 is provided, a "Type" grouping 1750 is provided and a "Filter and Sort" grouping 1760 is provided in which a variety of functionality controls for operating on a selected pivot chart are made available to the user.

Figure 18:
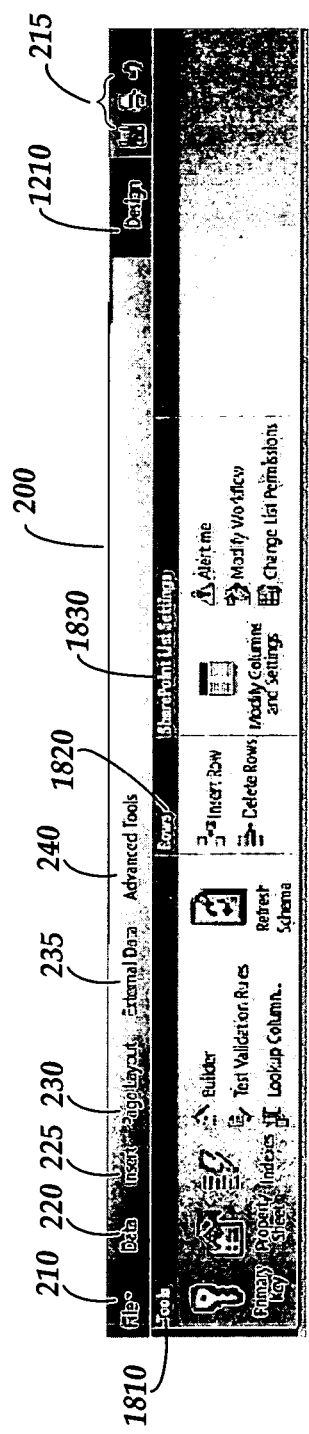
FIG. 18 illustrates a computer screen display showing the user interface illustrated in FIG. 3 and showing a contextual tab for providing commands for building a Table in a database design view.

FIG. 18 illustrates a computer screen display showing the user interface illustrated in FIG. 3 and showing a contextual tab for providing commands for building a Table in a database design view. The user interface 200 is populated with contextual user interface functionality associated with a selected database table object. That is, upon selection of a table object via the database application 106, the "Design" tab 1210 is deployed and upon selection of the "Design" tab 1210, the user interface 200 is automatically populated with one or more logical groupings of functionality controls associated with applying table object functionality to a selected table object according to the functions provided by the associated database application 106. Logical groupings of controls illustrated in FIG. 18 include a "Tools" grouping 1810, a "Rows" grouping 1820 and a "Sharepoint List Settings" grouping 1830. As with the other contextual user interfaces described herein with reference to FIGS. 9-18, selection of a different database object from the presently selected database object may cause the deployment of contextual user interface functionality associated with the subsequently selected data object.

As should be appreciated, according to one embodiment, selection of a given database object, as described herein with reference to FIGS. 9-18, automatically causes deployment of the logical groupings of functionality controls in the user interface 200 without the selection of the associated top-level, task-based tab if only one contextual user interface is available for the selected object. On the other hand, if two or more potential contextual user interfaces are available for a selected object, for example, formatting, control layout, or design, then additional top-level, task-based tabs, for example, the "Formatting" tab 910 and the "Control Layout" tab 915 (illustrated above in FIG. 9) are deployed for allowing selective deployment of functionality controls of the associated database application 106 under a desired task-based mode (for example, formatting versus control layout).

As should be appreciated, the illustrations and descriptions of contextual user interfaces described above with reference to FIGS. 9-18 are for purposes of illustration and example only and are not limiting of the different types of contextual user interfaces and different types of functionalities that may be provided in response to the selection of a given database object. For example, according to the ACCESS® database application manufactured and marketed by MICROSOFT CORPORATION, certain database file types known as Access Data Projects (ADPs) are database types that require different sets of commands than other database files. According to embodiments of the present invention, selection of an ADP database object may cause the deployment of a contextual user interface, such as those illustrated and described with reference to FIGS. 9-18, wherein particular functionality controls are provided for applying functions of the database application to ADP database objects. Likewise, contextual user interfaces may be developed and deployed for providing particular functionality associated with other types of database objects.

Figure 19:
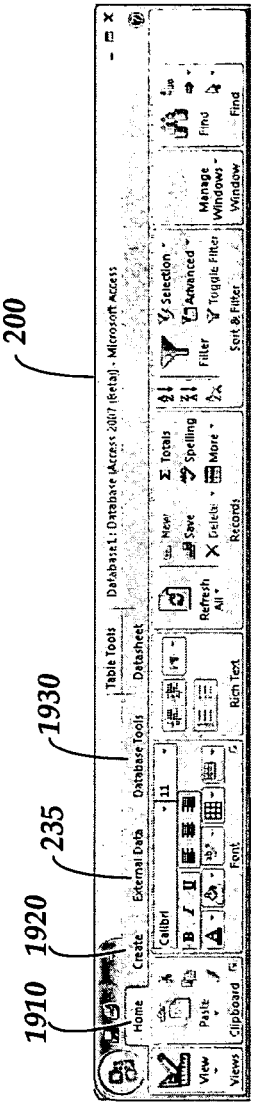
FIG. 19 is ribbon-shaped user interface for displaying task-based top-level functionality tabs and showing a selected Home tab for providing commands that are common across a number of data objects in a database application.

The user interface 200 illustrated in FIG. 19 represents an alternative embodiment of the user interface illustrated in FIG. 3. The user interface 200 illustrated in FIG. 19 provides top-level functionality tabs 1910, 1920, 235, 1930 for causing a display of logical groupings of buttons and controls for applying functionality of the associated database application to database objects and/or files. As illustrated in FIG. 19, upon selection of the "Home" tab 1910, a number of logical groupings of functionality controls are provided similar to the controls illustrated in FIG. 3 above. For example, logical groupings of controls are illustrated for views, clipboard functionalities, font functionalities, text functionalities, records functionalities, sorting and filtering functionalities, window functionalities and find functionalities.

Figure 20:
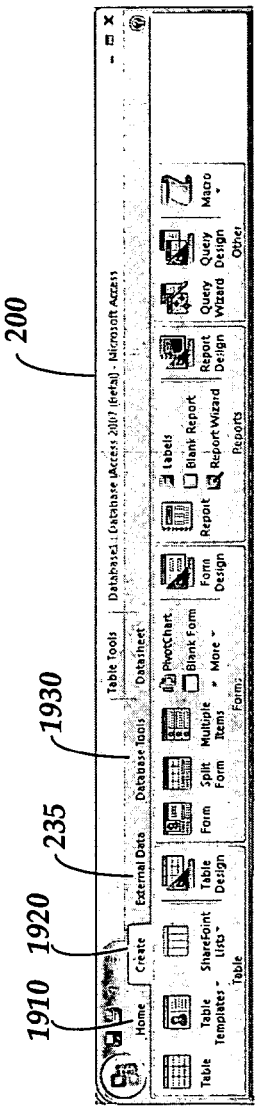
FIG. 20 is an illustration of a computer screen display showing the user interface illustrated in FIG. 19 and showing a selected Create tab for providing commands for creating and/or inserting a database object in a database file.

FIG. 20 is an illustration of a computer screen display showing the user interface illustrated in FIG. 19 and showing a selected Create tab for providing commands for creating and/or inserting a database object in a database file. As illustrated in FIG. 20, the "Create" tab 1920 is selected for providing logical groupings of functionality buttons or controls for creating and inserting data objects into a database, for example, tables, forms, reports, queries, macros and database modules. The functionality buttons and controls provided in response to selection of the "Create" tab 1920 are similar to the functionality buttons or controls described above with reference to FIG. 4 provided in response to a selection of the "Insert" tab 225.

Figure 21:
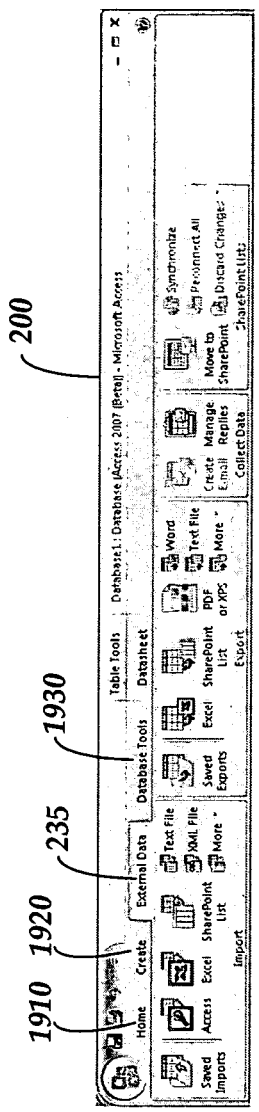
FIG. 21 illustrates a computer screen display showing the user interface illustrated in FIG. 19 and showing a selected External Data tab.

FIG. 21 illustrates a computer screen display showing the user interface illustrated in FIG. 19 and showing a selected External Data tab. As illustrated in FIG. 21, the "External Data" tab 235 is selected for providing logical groupings of buttons and controls associated with external data. The logical groupings of buttons or controls illustrated in FIG. 21 are similar to those buttons and controls illustrated in FIG. 6 and provide functionality of the associated database application for retrieving external data from a number of sources, including saved data, data maintained in a shared database, data maintained or enabled from a different software application, and the like, for inserting or otherwise applying to a given database object or database file.

Figure 22:
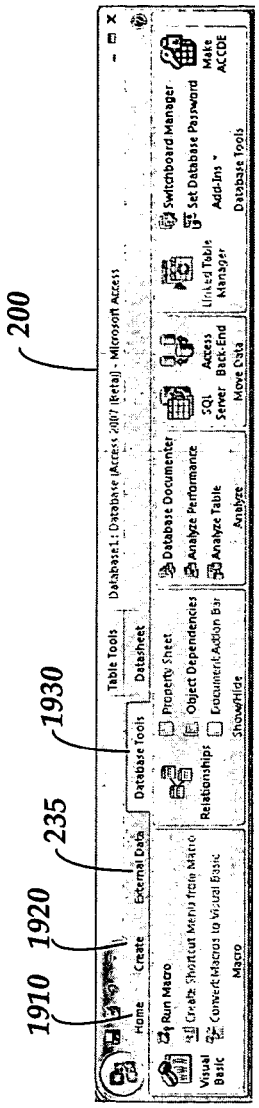
FIG. 22 illustrates a computer screen display showing the user interface illustrated in FIG. 19 and showing a selected Database Tools tab for providing commands for performing maintenance on a given database.

FIG. 22 illustrates a computer screen display showing the user interface illustrated in FIG. 19 and showing a selected Database Tools tab for providing commands for performing maintenance on a given database. As illustrated in FIG. 22, the "Database Tools" tab 1930 is selected for causing a display of logical groupings of buttons or controls similar to the buttons or controls illustrated in FIG. 7 in response to a selection of the "Advanced Tools" tab 240. The database tools provided in the logical groupings of buttons or controls illustrated in FIG. 22 allow for such advanced features as database analysis, database security functions, database macro utilization and database relationship creation and maintenance.

Figure 23:
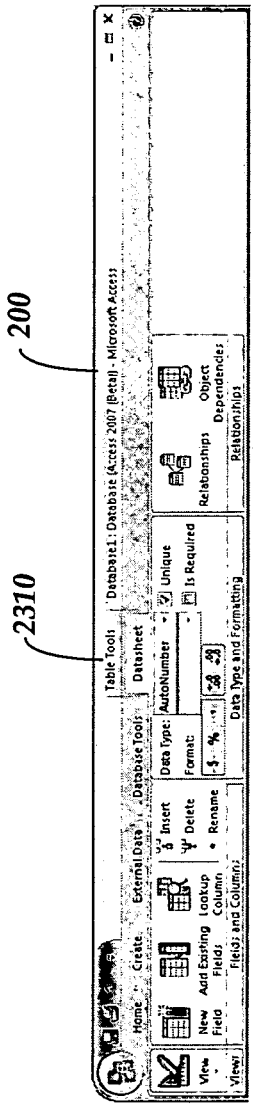
FIG. 23 illustrates a computer screen display showing the user interface illustrated in FIG. 19 and showing a contextual tab for providing database functionality available for application to a table object.

As described above with reference to FIGS. 9-18, a variety of contextual tabs may be provided in the user interface 200 for providing one or more functionality buttons or controls associated with a particular database object selected or focused-on in a database file. FIG. 23 illustrates a computer screen display showing the user interface illustrated in FIG. 19 and showing a contextual tab for providing database functionality available for application to a table object. As illustrated in FIG. 23, upon selection or focus on a database table, a "Table Tools" tab 2310 may be deployed in the user interface 200 for providing logical groupings of buttons or controls associated with functionalities of the database application that may be applied to a database table. For example, functionality buttons and controls are provided in the user interface 200 in response to a selection of the "Table Tools" tab 2310 for applying fields and columns, data type and formatting and data object relationships to data contained in a database table.

Figure 24:
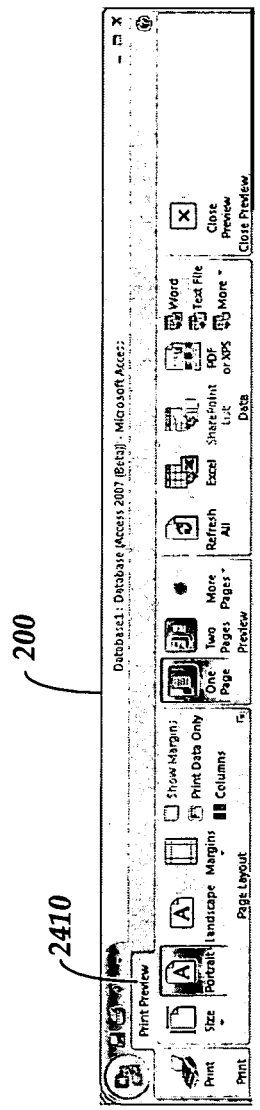
FIG. 24 illustrates a computer screen display showing a ribbon-shaped user interface for displaying task-based top-level functionality tabs and showing a Print Preview tab for providing commands for affecting printing settings for a selected database object.

FIG. 24 illustrates an alternative ribbon-shaped user interface to the user interface illustrated in FIG. 8B for displaying logical groupings of functionality buttons and controls associated with a "Print Preview" tab. As illustrated in FIG. 24, a number of logical groupings of controls are provided for choosing different print settings for an associated database object similar to those print settings illustrated above in FIG. 8B. For example, a "Page Layout" grouping of controls provides for selectively printing a database object in "Portrait" orientation or "Landscape" orientation and provides for setting margins and other page layout properties prior to printing a given database object or file.

According to embodiments of the invention, an extensibility model is provided for allowing a user to customize the user interfaces 200 according to their individual needs. According to one embodiment, customizations of user interfaces 200 are enabled by providing an application programming interface (API) method that allows software developers or users to submit customizations of a given user interface 200 to the database application for use with a given database or database object (e.g., document, form, report, etc.). In one embodiment, customizations submitted via the API method are in the form of Extensible Markup Language (XML) based user interface customizations that will cause a given user interface 200 to have custom properties when loaded. The customized XML markup need not reside in a given database or database object. Thus, developers may create database templates (e.g., forms or reports templates) having customized versions of the user interface 200 that may be distributed to users for implementation as software add-ins to the database application.

A developer of a user interface customization may create an AutoExec macro that calls a desired customization for loading. The AutoExec macro causes the desired customization to call the API method (e.g., an Application.LoadCustomUI method) and specifies the XML and any associated friendly name pairs for the customization. Upon receipt by the database application, a user interface cookie is generated by the database application for each unique customization name (e.g., sales form user interface), and customizations are submitted by the application to the user interface 200 for implementation. Each unique user interface customization may be stored in a library of customizations and may be presented to end users via a menu of choices (e.g., a combo box) from which a user may select a desired customization.

The loading and unloading of customizations is application driven via properties associated with the customizations for a given database or database object. Database level customizations take effect after database restart. For database objects, such as forms and reports, changes to a given user interface may be made while the database application is running by selecting a desired user interface customization for a given database object.

As described above, user interface customizations may be provided for various database objects, for example, forms and reports. In the case of contextual user interface tabs, as described above with reference to FIGS. 9-18, XML markup is rendered such that it replaces the contents of the native user interface 200 when an associated object is selected or focused on. For example, when a report is opened for which a customized contextual user interface is provided, the contents of the native user interface 200 are replaced according to the XML markup associated with a customized user interface designed for the report.

For purposes of illustration, consider the following examples. A user generates and deploys a number of sample databases. The user's desire is to provide customized menus for her major forms and reports. For example, her sales and inventory application main navigation form provides a menu that allows a user to navigate to a Customers and Payments form; an Orders form; a Product and Inventory form; a Vendors and Purchase Orders form; and the like. According to an embodiment of the invention, a customized user interface 200 is generated, as described above, and when any of these forms are launched, a customized form-editing user interface 200 is provided.

According to another example, a large international organization may develop a number of database objects (forms, reports, etc.) in multiple languages (for example, German, English, Italian, French, etc.). According to embodiments of the present invention, a developer of such database objects may develop a customized user interface for each potential language for a given database object, for example, a database report. Upon launching the database report, a dialog may be presented to the user to ask the user which language is desired for the launched database report. Once the user selects a given language, the customized user interface associated with the selected language may be loaded, and the user interface 200 is launched with the desired language.

According to another example, security may be imposed on a given database or database object by customizing the commands available in the user interfaces 200 based on user security access. For example, a given user may be required to provide a password or other login credential to launch a given database or database object. A given user's login credentials may be associated with a version of one or more user interfaces 200 that provide a customized set of commands for allowing the user to perform certain specified operations on the selected database or database object. Once the identified user's credentials are associated with an XML markup stored for the specified security level, the associated XML markup may be loaded, as described above, and the required user interface 200 will be launched with a set of commands prescribed by the associated XML markup.

These embodiments are also useful for purposes of backward compatibility because a particular user may have generated a large number of database objects, such as forms or reports, using a previous or legacy version of the database application where the previous version of the database application user interface provided functionality via command bars, toolbars, dropdown menus and the like. Prior or legacy user interfaces 200 may be stored as customized user interfaces and may be launched in place of current version user interfaces 200 upon command. According to one embodiment, the legacy user interface customizations are only launched in place of the current version user interfaces when the entire database application has been set to use backward compatibility user interfaces. Alternatively, the legacy user interface customizations may be rendered by selection of an "Add-Ins" type tab deployed in the user interfaces 200. According to another embodiment, a backward compatibility mode/view may be included in the current version user interfaces 200. If a given user had previously configured a database or database object not to allow full user interfaces 200, a different display of a given user interface 200 may be provided where only a single tab is displayed for all database objects and contexts. Selection of the single tab may then cause the user interface 200 to be populated with legacy user interface commands as desired.

As described herein, an improved user interface is provided for exposing task-based top-level functionality tabs for displaying logical groupings of selectable database application functionality controls associated with given database application modes of operation. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:
1. A computer readable storage medium containing computer executable instructions which when executed by a computer perform a method for providing functionality from a database application via an improved user interface, the method executed by the computer executable instructions comprising:
   providing a plurality of functionalities available from the database application;
   organizing the plurality of functionalities according to a plurality of tasks;

providing user interface tabs for each of the plurality of tasks, each of the user interface tabs being operative to deploy, upon selection, layouts of logically grouped functionality controls;

receiving an indication of a selection of a database object within the database application; and deploying, in response to the received indication, a database user interface tab comprising a layout of logically grouped functionality controls having a plurality of selectable controls associated with editing a selected data object, wherein deploying the database user interface comprises replacing at least one previously displayed selectable control with the plurality of selectable controls associated with editing the selected data object, wherein the plurality of selectable controls comprise:
a first control for retrieving external data,
a second control for exporting database application data to an external database, and
a third control for handling server-based data via electronic transmission.

2. The computer readable storage medium of claim 1, further comprising upon receiving an indication of a selection of one of the plurality of selectable controls, applying functionality associated with the selected one of the plurality of selectable controls to the selected data object.

3. The computer readable storage medium of claim 1, further comprising upon receiving an indication of a selection of a user interface tab, providing in the user interface a plurality of additional selectable controls for selecting a plurality of additional functionalities associated with the selected user interface tab.

4. The computer readable storage medium of claim 1, further comprising:
upon receiving an indication of a focus on a user interface tab, providing in the user interface a plurality of additional selectable controls for selecting a plurality of additional functionalities associated with the selected user interface tab, the plurality of additional selectable controls replacing the plurality of selectable controls displayed prior to receiving the indication of the focus; and
upon cessation of the focus on one of the following: the user interface tab and a contents of the user interface tab, restoring the plurality of selectable controls displayed prior to receiving the indication of the focus.

5. The computer readable storage medium of claim 4, further comprising:
after providing in the user interface the plurality of additional selectable controls for selecting the plurality of additional functionalities organized under the second task, receiving an indication of a selection of one of the plurality of additional selectable controls;
applying functionality associated with the selected one of the plurality of additional selectable controls to the selected data object; and
when the user interface tab is no longer in focused on for persisting a provision in the user interface of the plurality of additional selectable controls for selecting the plurality of additional functionalities organized under the second task, restoring the plurality of selectable controls displayed prior to receiving the indication of the focus.

6. The computer readable storage medium of claim 1, further comprising providing in the user interface a contextual user interface tab for each of the plurality of tasks that are operative with the functionalities provided by the database application.

7. The computer readable storage medium of claim 6, further comprising upon receiving an indication of a selection of the contextual user interface tab, providing in the user interface the plurality of selectable controls in the user interface for selecting the plurality of functionalities with the plurality of additional selectable controls representing the functionalities provided by the database application.

8. The computer readable storage medium of claim 7, further comprising grouping the plurality of additional selectable controls representing the functionalities provided by the database application operative to edit the selected object into at least one logical grouping of selectable controls, the at least one logical grouping being associated with a subset of the plurality of additional selectable controls representing the functionalities provided by the database application.

9. The computer readable storage medium of claim 1, wherein receiving the indication of the selection of the data object includes receiving an indication of a selection of a database form for editing via the database application.

10. The computer readable storage medium of claim 1, wherein receiving the indication of the selection of the data object includes receiving an indication of a selection of a database report for editing via the database application.

11. The computer readable storage medium of claim 1, wherein receiving the indication of the selection of the data object includes receiving an indication of a selection of a database table for editing via the database application.

12. The computer readable storage medium of claim 1, wherein receiving the indication of the selection of the data object includes receiving an indication of a selection of a database pivot chart for editing via the database application.

13. The computer readable storage medium of claim 1, wherein receiving the indication of the selection of the data object includes receiving an indication of a selection of a database pivot table for editing via the database application.

14. A system for providing an improved user interface operative to provide functionality from a database application, the system comprising:
a memory storage; and
a processing unit coupled to the memory storage, the processing unit being operative to:
dispose a plurality of tabs in an upper row of the user interface, each of the plurality tabs being operative, upon selection, to deploy, in a lower row of the user interface underneath the disposition of the plurality of tabs, a layout of a plurality of selectable functionality controls corresponding to database tools,
receive a selection of a database object for editing,
determine a mode of operation for editing the database object, wherein each mode of operation is associated with a plurality of selectable controls; and
dispose the plurality of selectable functionality controls in the lower row, wherein the processing unit being configured to dispose the plurality of selectable functionality controls comprises the processing unit being configured to replace at least one previously deployed selectable functionality control with the plurality of selectable functionality controls, each of the plurality of selectable functionality controls corresponding to the determined mode of operation associated with the selected database object, the determined mode of operation allowing for the following:
retrieval of external data,
exportation of internal data, and
managing, via electronic transmission, server-based data.

15. A method for providing functionality from a database application via an improved user interface, the method comprising:
provide a plurality of functionalities available from the database application;
organizing the plurality of functionalities according to a plurality of tasks;
providing user interface tabs for each of the plurality of tasks, each of the user interface tabs being operative to deploy, upon selection, layouts of logically grouped functionality controls;
receiving an indication of a selection of a database object; and
upon receiving an indication of the selection of the database object, deploying a layout of logically grouped functionality controls for editing in the selected database object, wherein deploying the layout of the logically grouped functionality controls comprises replacing a previously deployed set of functionality controls, the deployed logically grouped functionality controls being associated with database tools for:
retrieving external data,
exporting database application data to an external database, and
handling server-based data via electronic transmission.

16. The method of claim 15, wherein receiving the indication of the selection of the database object within the database application comprises receiving an indication of a selection of at least one of the following: a database form, a database report, a database table, database pivot chart, and database pivot table for editing via the database application.

17. The method of claim 15, wherein deploying the layout of the logically grouped functionality controls for editing the selected database objects comprises replacing previously deployed functionality controls.

18. The method of claim 15, wherein retrieving the external data comprises retrieving the external data from at least one of the following: saved data, data maintained in a shared database, and data that is one of: maintained and enabled from a different software application.

\* \* \* \* \*